(12) United States Patent
Yoshimine et al.

(10) Patent No.: US 6,963,898 B2
(45) Date of Patent: Nov. 8, 2005

(54) CONTENT PROVIDING DEVICE AND SYSTEM HAVING CLIENT STORAGE AREAS AND A TIME FRAME BASED PROVIDING SCHEDULE

(75) Inventors: Takao Yoshimine, Kanagawa (JP); Mototsugu Tsutsui, Kanagawa (JP); Takahiko Sueyoshi, Tokyo (JP); Toshinori Nakamura, Kanagawa (JP); Hiroyuki Hanaya, Kanagawa (JP); Nobuyuki Uchiyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 805 days.

(21) Appl. No.: 09/821,501

(22) Filed: Mar. 29, 2001

(65) Prior Publication Data

US 2002/0016848 A1 Feb. 7, 2002

(30) Foreign Application Priority Data

| Mar. 30, 2000 | (JP) | ................................. 2000-097881 |
| Mar. 30, 2000 | (JP) | ................................. 2000-097882 |
| Mar. 30, 2000 | (JP) | ................................. 2000-097883 |

(51) Int. Cl.[7] ............................................. G06F 13/00
(52) U.S. Cl. ........................................................ 709/203
(58) Field of Search .............................. 707/1, 9, 200, 707/205; 709/201, 203, 219, 231, 232, 200; 718/102

(56) References Cited

U.S. PATENT DOCUMENTS

| 5,758,257 | A | 5/1998 | Herz et al. |
| 5,768,528 | A | 6/1998 | Stumm |
| 6,049,322 | A | 4/2000 | Yoshikawa et al. |
| 6,594,682 | B2 * | 7/2003 | Peterson et al. ............. 718/102 |
| 6,614,804 | B1 * | 9/2003 | McFadden et al. .......... 370/468 |

FOREIGN PATENT DOCUMENTS

| JP | 11 353192 | 12/1999 |
| WO | WO 99 03047 | 1/1999 |
| WO | WO 00 57335 | 9/2000 |
| WO | WO 01 33381 | 5/2001 |

OTHER PUBLICATIONS

"i–drive Website" Online! Aug. 24, 1999, I–DRIVE.COM, XP002283773 Retrieved from the Internet: URL:web.archive.org/web/19990824172137/http://www.i–drive.com/index.html> retrieved Jun. 7, 2004!.

"x–drive Website" Online! Oct. 13, 1999, X–DRIVE, XP002283774 Retrieved from the Internet: URL: web.archive.org/web19991013143317/xdrive.com/whatis.html> retrieved in Jun. 7, 2004!.

Moskowitz L: "Filo Files the Web Your Way" Online! Feb. 1, 2000, XP002198599 Retrieved from the Internet: URL: http://www.pcworld.com/resource/printable/article/0,aid, 15081,00.asp> retrieved on Feb. 1, 2000!.

* cited by examiner

Primary Examiner—Robert B. Harrell
(74) Attorney, Agent, or Firm—Frommer Lawrence & Haug LLP; William S. Frommer; Darren M. Simon

(57) ABSTRACT

A content providing device, content providing method, program storage media, content providing system and content reservation control method are disclosed. Many kinds of contents to be provided in a time schedule frame matching the time demanded are sequentially provided to a client PC 4 based on a providing schedule set up to provide plural kinds of contents in each time schedule frame one by one, which keeps a client interested. A plurality of user PCs 2 share the exclusive storage area in the content server 39 and thus contents can be supplied to many and unspecific persons who have accessed. When the number of contents to be provided simultaneously at a desired time on the providing schedule has reached the upper value, reservations are controlled, thereby preventing the lowering of content transferring speed and ensuring a speedy provision.

6 Claims, 28 Drawing Sheets

21

APPLICATION FOR PERSONAL CASTING SERVICE
USER INFORMATION REGISTRATION

| | |
|---|---|
| NAME | KIMURA TAROU |
| ADDRESS | KITASHINAGAWA SHINAGAWA WARD TOKYO... |
| TELEPHONE NUMBER | 03-5448-XXXX |
| E-MAIL ADDRESS | Kim@.... |
| DATE OF BIRTH | DEC. 18. 1985 |
| CREDIT CARD NUMBER | Xxxx xxxx xxxx xxxx |
| FIRST DESIRED USER ID | Kimukimu |
| SECOND DESIRED USER ID | Kimura |
| THIRD DESIRED USER ID | Taro |
| DESIRED CHANNEL NAME | KIMURA Ch |
| PASSWORD | ***** |
| PASSWORD CONFIRMATION | ***** |
| SERVICE APPLIED FOR | |
| AS MUCH AS I LIKE | |
| BEGINNER'S COURSE | O |

22 ~ ( CANCEL )   ( APPLICATION ) ~ 23

| | |
|---|---|
| NAME | KIMURA TAROU |
| ADDRESS | KITASHINAGAWA SHINAGAWA WARD TOKYO... |
| TELEPHONE NUMBER | 03-5448-XXXX |
| E-MAIL ADDRESS | Kim@.... |
| DATE OF BIRTH | DEC. 18. 1985 |
| CREDIT CARD NUMBER | Xxxx xxxx xxxx xxxx |
| FIRST DESIRED USER ID | Kimukimu |
| SECOND DESIRED USER ID | Kimura |
| THIRD DESIRED USER ID | Taro |
| DESIRED CANNEL | KIMURA Ch |
| PASSWORD | ***** |
| PASSWORD CONFIRMATION | ***** |
| SERVICE APPLIED FOR | |
| AS MUCH AS I LIKE | |
| BEGINNER'S COURSE | O |

USER INFORMATION DB TABLE

USER ID:KIMUKIMU
CHANNEL NAME:KIMURA CHANNEL
URL:www//xxx.xxx.
PASSWORD:****
NAME:KIMURA TARO
ADDRESS:KITASHINAGAWA, SHINAGAWA WARD, TOKYO
TELEPHONE:03-5448-****
E-MAIL ADDRESS:kim@....
DATE OF BIRTH:DEC.18.1985
CREDIT CARD NUMBER:Xxxx xxxx xxxx xxxx
TYPE OF SERVICE APPLIED FOR:AS MUCH AS I LIKE
ACCUMULATED NUMBER OF POINTS:xxxxP
USER STATUS:STAGE 1
DATE AND TIME OF CONNECTION STARTED:
  ○HOURS×MINUTES△SECONDS, □DAY○MONTH
DATE AND TIME CONNECTION ENDED:
  ×HOURS△MINUTES□SECONDS, ○DAY×MONTH,
INTERNET CONNECTION CHARGE:XXXX¥
SERVICE USER CHARGE:XXXX¥

FIG. 9

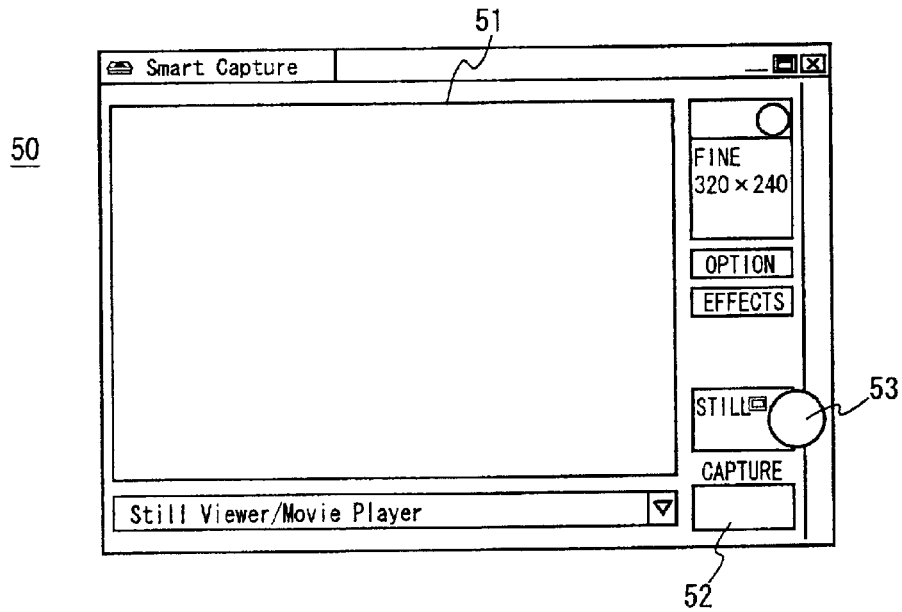

FIG. 10

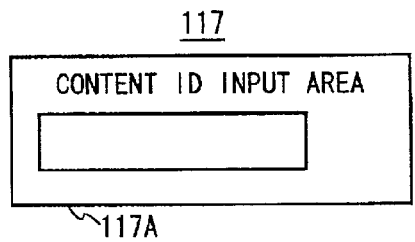
FIG. 20
```
                                    120
ISP CONNECTION END  : (ISP NAME)
ASP CHANNEL         : MY CHANNEL
URL                 : WWW//XXX.XXX.
CONTENT ID          : ***
CODEC               : MPEG4
IMAGE GENRE         : CARS
PROVIDING SCHEDULE  : TO BE PROVIDED FROM 6:00 FEB. 19
COMMERCIAL REQUEST  : COMMERCIAL INCLUDED
CM LINK             : COMMERCIAL NOT INCLUDED
USER ID             : KIMUKIMU
PASSWORD            : ***
```
FIG. 21
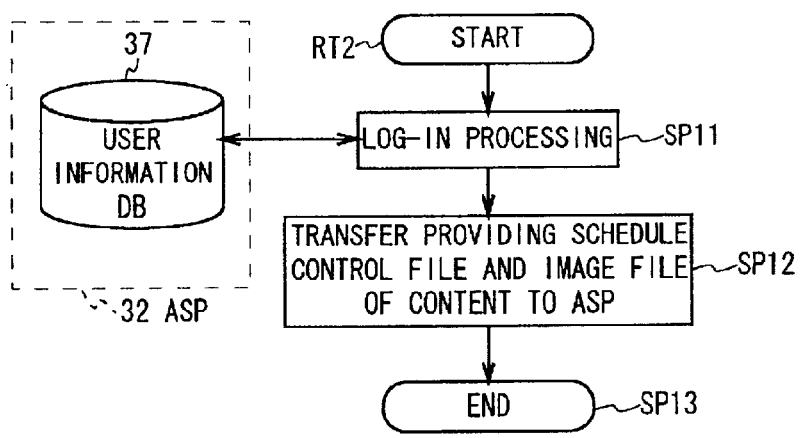
FIG. 22

| | |
|---|---|
| ISP CONNECTION END | : ***** (ISP NAME) |
| ASP CHANNEL | : PUBLIC CHANNEL |
| CONTENT NAME | : XX TOUR |
| CODEC | : MPEG4 |
| PUBLIC CHANNEL | : LIVE MUSIC CHANNEL |
| PROVIDING SCHEDULE | : TO BE PROVIDED FROM 10:00 FEB. 19 |
| COMMERCIAL REQUEST | : COMMERCIAL INCLUDED |
| USER ID | : KIMUKIMU |
| PASSWORD | : **** |

189

| | | |
|---|---|---|
| ISP CONNECTION END | : | *****(ISP NAME) |
| ASP CHANNEL | : | MY CHANNEL |
| CODEC | : | MPEG4 |
| IMAGE GENRE | : | MUSIC |
| PROVIDING SCHEDULE | : | TO BE PROVIDED FROM 10:00 FEB. 19 |
| COMMERCIAL REQUEST | : | COMMERCIALS INCLUDED |
| USER ID | : | kimukimu |
| PASSWORD | : | ***** |

212

YOUR DESIRED TIME SCHEDULE ALREADY FULLY BOOKED. PLEASE SELECT OTHER TIME SCHEDULE

| 270 | |
|---|---|
| ¥500 | ~271 |
| ¥1000 | ~272 |
| ¥2000 | ~273 |
| ¥5000 | ~274 |
| ¥8000 | ~275 |
| ¥10000 | ~276 |

CONTENT PROVIDING DEVICE AND SYSTEM HAVING CLIENT STORAGE AREAS AND A TIME FRAME BASED PROVIDING SCHEDULE

BACKGROUND OF THE INVENTION

1. Field of the Invention

The present invention relates to a content providing device, content providing method, program storage media, content providing system and content reservation control method, and profit give-back system, and more particularly, is suitably applied to a computer network system providing a content through the Internet for example.

2. Description of the Related Art

In the case that a content consisting of images and/or voices created by an individual is provided via the Internet in a computer network system, it has been generally practiced up until now that he/she establishes homepages of his/her own created using a personal computer.

In such a case where an individual opens homepages as in the above, a user acquires a homepage creation program by means of a personal computer, based on which homepages are created, hyper-linked with a plurality of content, which are stored in the server of an Internet service provider (this is referred to as "ISP" hereinafter).

And, the ISP provides homepages from the server to a client accessing it through the Internet, and when the anchor on the homepages is clicked, a hyper-linked content s provided subsequently.

In such a computer network system structured as described above, the same content is to be supplied continually to a client accessing it until the content of a homepage opened is renewed, which has posed a problem of the client getting tired of it.

Also, in the computer network system, when an ISP provides plural types of contents to a plurality of clients at the same time responding to demands received simultaneously for plural types of contents hyper-linked on the homepage from a plurality of clients, there has been a problem that the contents are not transmitted swiftly due to the large consumption of the bandwidth of network resources such as lines.

Furthermore, in such a computer network system structured as described above, even when a content is provided on a personal homepage created by a user through an ISP, it is not always the case that a large number of clients access the personal homepage, and so there has been a problem that a content created by an individual is not necessarily provided widely to many and unspecific persons.

Still further, in such a computer network system structured as described above, the data of homepages stored in the server of an ISP is to read out responding to a demand from a client, which is provided over the Internet, however, there is a limitation to the number of the data of homepages to be provided simultaneously from the server due to the limitations of the processing performance of the server and the bandwidth of a line.

Because of the above, in a computer network system, there has been a problem that it comes to be hard to provide homepages swiftly to all of a plurality of clients when the number of demands exceeds the upper limitation due to the occurrence of a large number of demands for various homepages from the server of the ISP at one time.

SUMMARY OF THE INVENTION

In view of the foregoing, an object of the first invention of the present invention is to provide a content providing device, content providing method, program storage media, and a content providing system that may keep clients interested.

An object of the second invention of the present invention is to provide a content providing device, content providing method, program storage media, and a content providing system that may make it possible to provide a content created by an individual widely to many and unspecific persons.

An object of the third invention of the present invention is to provide a content providing device, content reservation control method, program storage medium, and content providing system capable of providing contents swiftly without fail responding to demands.

The foregoing object and other objects of the first invention of the present invention have been achieved by the provision of a content providing device, content providing method, program storage media, and a content providing system in which with plural kinds of contents read from the exclusive storage area secured an individual, the demand time is recognized when a client makes a demand for a content over a network from a content storing and providing means for providing the content over the network, and with the type of the content judged, that content is to be provided in a time schedule frame matching the demand time based on the providing schedule so set up as to provide one type out of the plural types of contents in a given time schedule frame, so that that type of the content judged above is provided from the content storing and providing means to the client over the network.

Thus, different kinds of contents can be provided in each time schedule frame appointed by the client as if from a personal broadcast station so that a variety of contents can be provided in order in accordance with the providing schedule without making the client weary, which makes it possible to provide contents swiftly without fail without consuming a large bandwidth of the line because the only type of a content is provided in each time schedule frame.

The foregoing object and other objects of the second invention of the present invention have been achieved by the provision of a content providing device, content providing method, program storage media, and a content providing system in which a content supplied from a first information processing device is stored in the exclusive storage area placed for the public, from which the content is read out responding to a demand from a second information processing device, and a control is performed in a way that a plurality of the first information processing devices share the exclusive storage area placed for the public in content storing and providing means providing the content to the second information processing device over a network.

Thus, because a plurality of the first information processing devices can share the exclusive storage area placed in the content storing and providing means for the public, a plurality of the first information processing devices having written contents in the exclusive storage area can provide the contents widely to many and unspecific second information processing devices accessing the exclusive storage placed for the public.

The foregoing object and other objects of the third invention of the present invention have been achieved by the provision of a content providing device, content reservation control method, program storage medium, and content providing system in which contents supplied from an information processing device are once stored in the exclusive storage area secured for an individual person. With those contents retrieved responding to demands from clients, providing schedule time data is received from the information processing device over a network, which indicates the providing schedule time of contents to be provided by the content storing and providing means for providing those contents to clients over the network, based on which the providing schedule of the contents is set up, concurrently setting up the upper limitation of the number of contents to be provided simultaneously at a given time on the providing schedule. And, when it is detected that the upper value of the number of contents that could be provided simultaneously at a given time is reached, it is notified of the information processing devices over the network that reservations are impossible at that particular time on the providing schedule.

With the upper value of the number of contents to be provided at one time set up, when it is detected that the upper value specified of the number of contents to be provided simultaneously at a desired time on the providing schedule, it is notified of the information processing devices over the network that a reservation is impossible for that particular time on the providing schedule, which prevents against setting a providing schedule for the number of contents exceeding the upper value, so that contents may be always provided swiftly to a plurality of clients without fail.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 5 is a schematic diagram showing a user information registration screen;

FIG. 6 is a schematic diagram showing a user information file;

FIG. 9 is a schematic diagram showing the content of a user information DB table registered in user information database;

FIG. 10 is a schematic diagram showing a capture screen;

FIG. 20 is a schematic diagram showing a content ID setup screen;

FIG. 21 is a schematic diagram showing the content of a on-demand type providing schedule control file;

FIG. 22 is a flowchart showing a connection processing sequence to an ASP in the on-demand type;

DETAILED DESCRIPTION OF THE EMBODIMENT

Preferred embodiments of this invention will be described with reference to the accompanying drawings:

(1) Principle of Electronic Commerce Utilizing the Internet

The Internet is a computer network system configured by connecting a great number of computers one another by means of a communication link, which is designed such that information can be transmitted and/or received among the computers one another with the use of various services such as e-mail, Gopher, and World Wide Web (WWW).

Figure 1:
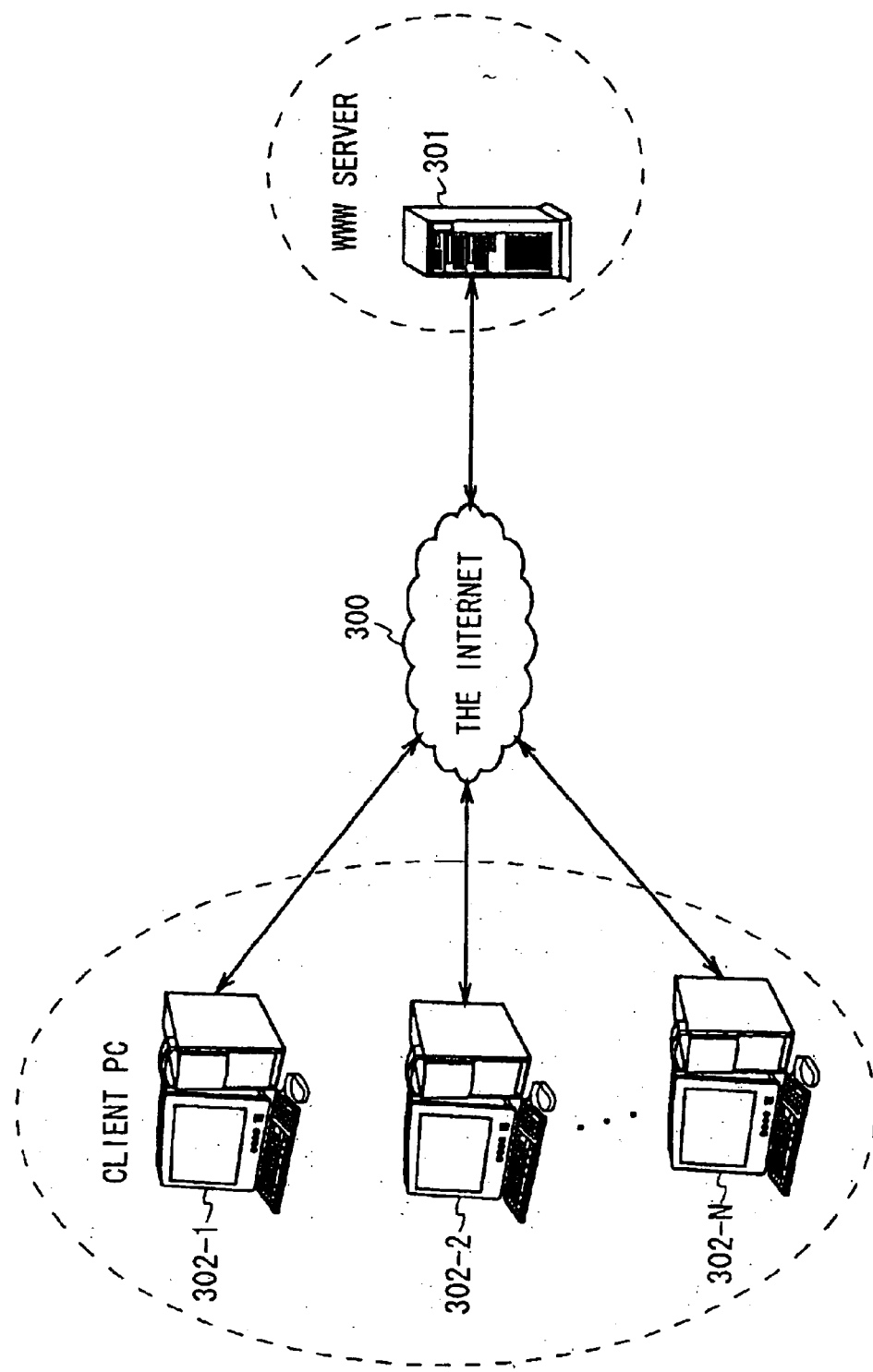
FIG. 1 is a block diagram used in explaining the principle of electronic commercial dealings utilizing the Internet.

As shown in FIG. 1, a WWW server 301 (also called "Web server" or "Web site", etc.), which provides a variety of services contained in the WWW to a client Personal Computer (PC) 302-1 to 302-N via the Internet, stores Web pages composed of graphic information such as figures and images on the internal hard disk.

Each resource used on this WWW 301 or Web pages, etc., can be recognized unmistakably with a Uniform Resource Locator (URL), an advertisement technique to make a distinction on the Internet 300.

Accordingly, when the URL of Web pages a user wants to peruse is appointed by the user for example following a specified transfer protocol for Hyper Text Transfer Protocol (HTTP) and so on, a client PC 302-1 to 302-N connected to the Internet 300 makes a demand to the WWW server 301 for reading the Web pages in accordance with the URL.

Upon receiving the Web pages transmitted from the WWW server 301 as a result of demanding reading from the WWW server 301, the client PC 302-1 to 302-N lets its display unit show the Web pages through a WWW browser stored in advance on the internal hard disk, thereby enabling the user to read the Web pages.

A Web page is typically defined with the use of Hyper Text Markup Language (HTML), and an HTML document defining the Web page includes signs called tags (reserved words) regulated by HTML which specify how the Web page should be displayed.

For additional information, an HTML document includes various tags to indicate graphics, control, and other functions, and is concurrently capable of appointing as a linkage point the URL of a Web page usable with a WWW server 301 or other WWW servers, from which the reading of the Web page is demanded.

Accordingly, Web pages are to be shown on the display unit of client PC 302-1 to 302-N in a display method intended by the provider of the Web pages.

In recent years, however, the foregoing WWW has come into use in electronic commerce utilizing the Internet 300.

In this case, Web pages composed of commodity catalogs electrically tabling products for sale are prepared in a WWW server 301, which are transmitted to a client PC 302-1 to 302-N owned by a client responding to his/her demand for inspecting them.

In this way a client PC 302-1 to 302-N lets the display unit show Web pages received from the WWW server 301 over the Internet 300, consequently letting a client inspect the catalogs of commodities for sale.

When a user specifies articles to purchase on the Web pages of the commodity catalogs shown on the display unit, a client PC 302-1 to 302-N notifies the WWW server 301 of that effect over the Internet 300.

Upon receiving it, the WWW server 301 demands client information from a client PC 302-1 to 302-N, and receives from it the client information including the name of a client purchasing products, credit card number owned by the client, address the products are to be delivered to.

Next, upon receipt of the above client information, the WWW server 301 transmits the Web page to a client PC 302-1 to 302-N, confirming an order for the products, and let the client confirm the content of the order on the Web page, subsequently arranging for them to be delivered.

In electronic commercial dealings utilizing the Internet 300 in this way, electronic commercial dealings can be applied to a variety of goods in the form of an electronic content such as music, which is electronically delivered to a clientele over the Internet 300, or to physical products such as personal computers, which are delivered to a clientele by home delivery firms.

Incidentally there is another method to define Web pages in addition to the HTML, namely what is called extensible Markup Language (XML), which, as is the case with the HTML, uses tags, but is capable of expressing the structure and meaning of a document, and of appointing attributes such as hierarchical structure and data type for tags by Document Type Definition (DTD).

Accordingly, in the WWW server 301, if a Web page is defined with the use of the XML, data for information processing such as an order acceptance code, commodity code, unit price, and quantity retained in advance in database for example, can be embedded into various tags respectively, so that the Web page can be used not only for inspecting, but for automatically carrying out information processing on calculating orders using data for information processing embedded into the tags.

(2) Structure of Content Providing System

Figure 2:
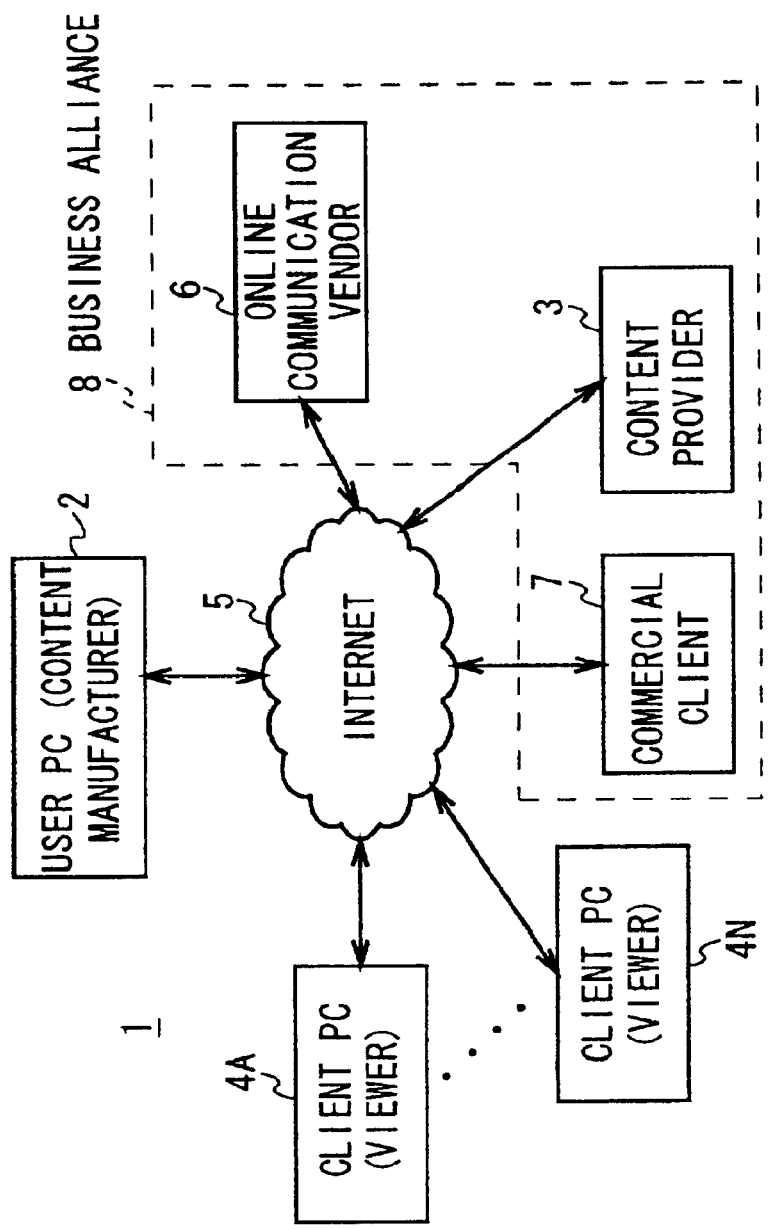
FIG. 2 is a schematic block diagram showing the structure of a content providing system of the present invention.

The 1 in FIG. 2 shows a content providing system in whole of the present invention to realize electronic commercial dealings utilizing the Internet, which comprises a user Personal computer (PC) 2 a content creator uses, content provider 3 storing a content created by the user PC 2 to be offered as required, plurality of clients PC 4 (4A to 4N) receiving the offer of a content specified on the Web site from the content provider 3, an online communication sales company 6, with which a content creator does online shopping over the Internet 5 through a user PC 2, and a commercial client 7 creating a commercial image and asking the content provider 3 to provide commercial images to the client PC 4, all connected one another over the Internet 5.

This content providing system 1 is a system wherein profits the content provider 3 receives are duly given back to a content creator (this is called "profit give-back" hereinafter)in accordance with the number of accesses a client PC 4 has made to a personal content created with a user PC 2, which may encourage the content creator to make still more excellent contents, and which may configure an entirely new business model over the Internet 5, with the aim of increasing the number of accesses a client PC 4 makes to Web sites.

A content provider 3, online communication sales company 6, and commercial client 7 enclosed in the broken lines, are affiliated one another forming a business alliance 8, which performs profits give-back processing in various modes to a content creator (user PC 2).

(3) User Registration Procedure for User PC

In this content providing system 1 a user PC 2 first needs to carry out a user registration procedure in respect to a content provider 3, which is explained in detail hereinafter.

Figure 3:
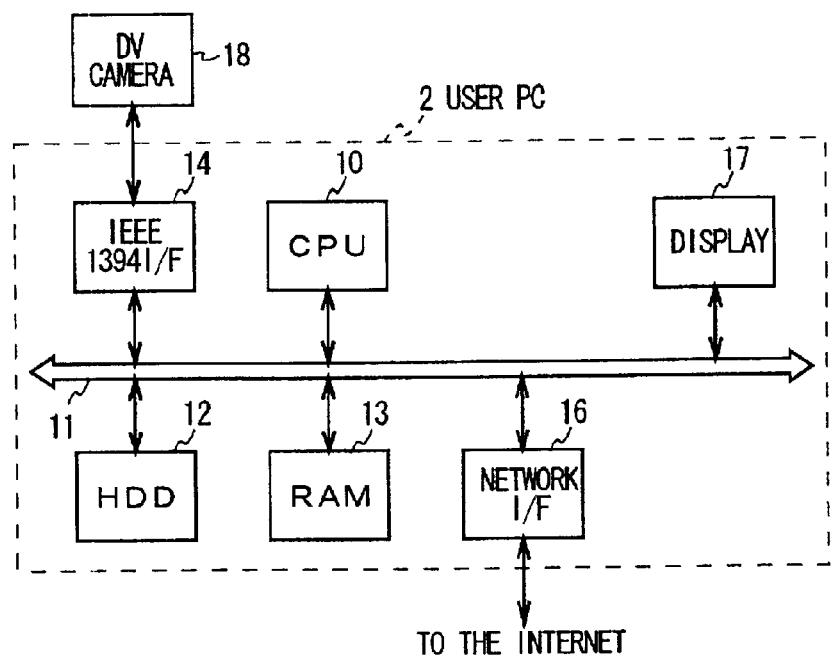
FIG. 3 is a schematic block diagram showing the structure of a user PC.

As shown in FIG. 3, a user PC 2 comprises a CPU 10, hard disk drive (HDD) 12, Random Access Memory (RAM)

13, Institute of Electrical and Electronics Engineers (IEEE) 1394 interface 14, network interface 16, and display unit 17 of a liquid crystal display, all connected one another over a bus 11.

In a user PC 2 like this, in addition to Operating System (OS) or a basic program, various kinds of other application software are stored on the HDD 12, which are turned on in RAM 13 as occasion arises to perform a specific process.

Figure 4:
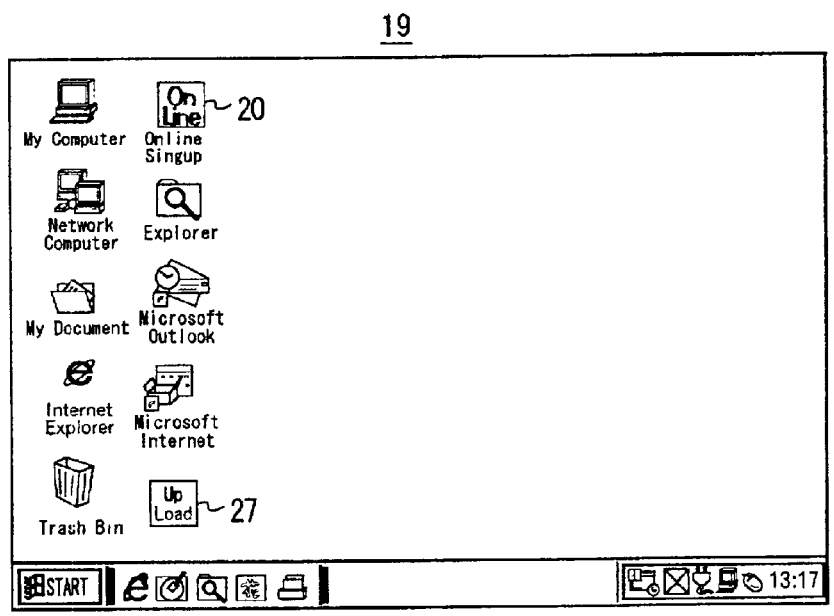
FIG. 4 is a schematic diagram showing a desktop screen.

That is, in the user PC 2, as shown in FIG. 4, when an online signup icon 20 on a desktop screen 19 (a Window screen of Microsoft Corporation) appearing on the display unit 17, is clicked by a content creator with the OS turned on, the CPU 10 starts up an automatic online signup software from the HDD 12, and lets the display unit 17 show a user information registration screen 21 as shown in FIG. 5.

This user information registration screen 21 is used to register user information when applying for a personal casting service as the screen title indicates. Following the screen, a content creator enters his/her name, address, telephone number, e-mail address, date of birth, credit card number, first desired user ID, second desired user ID, third desired user ID, desired channel name, password, and password confirmation, and finally, selects either an "as-much-as-I-like course" or "beginner's course" as an application for the service.

The personal casting service is a content providing mode newly started in the content providing system 1 of the present invention employing two content providing modes called an on-demand type and a live type respectively, of which contents are described in detail later in this document.

On the user information registration screen 21 are placed a cancel button 22 to make void the content of user information entered by the content creator, and an application button 23 to make an application with the user information entered by the content creator.

Accordingly, when the application button 23 is clicked after the user information is entered, the CPU 10 of a user PC 2 creates a user information file 25 containing a content similar to that on the user information registration screen 21 (FIG. 5) as shown in FIG. 6, which is transmitted from a network interface 16 (FIG. 3) to the content provider 3 in a given protocol over the Internet 5 (FIG. 2), and concurrently writes and retains the user information file 25 on the HDD 12.

Figure 7:
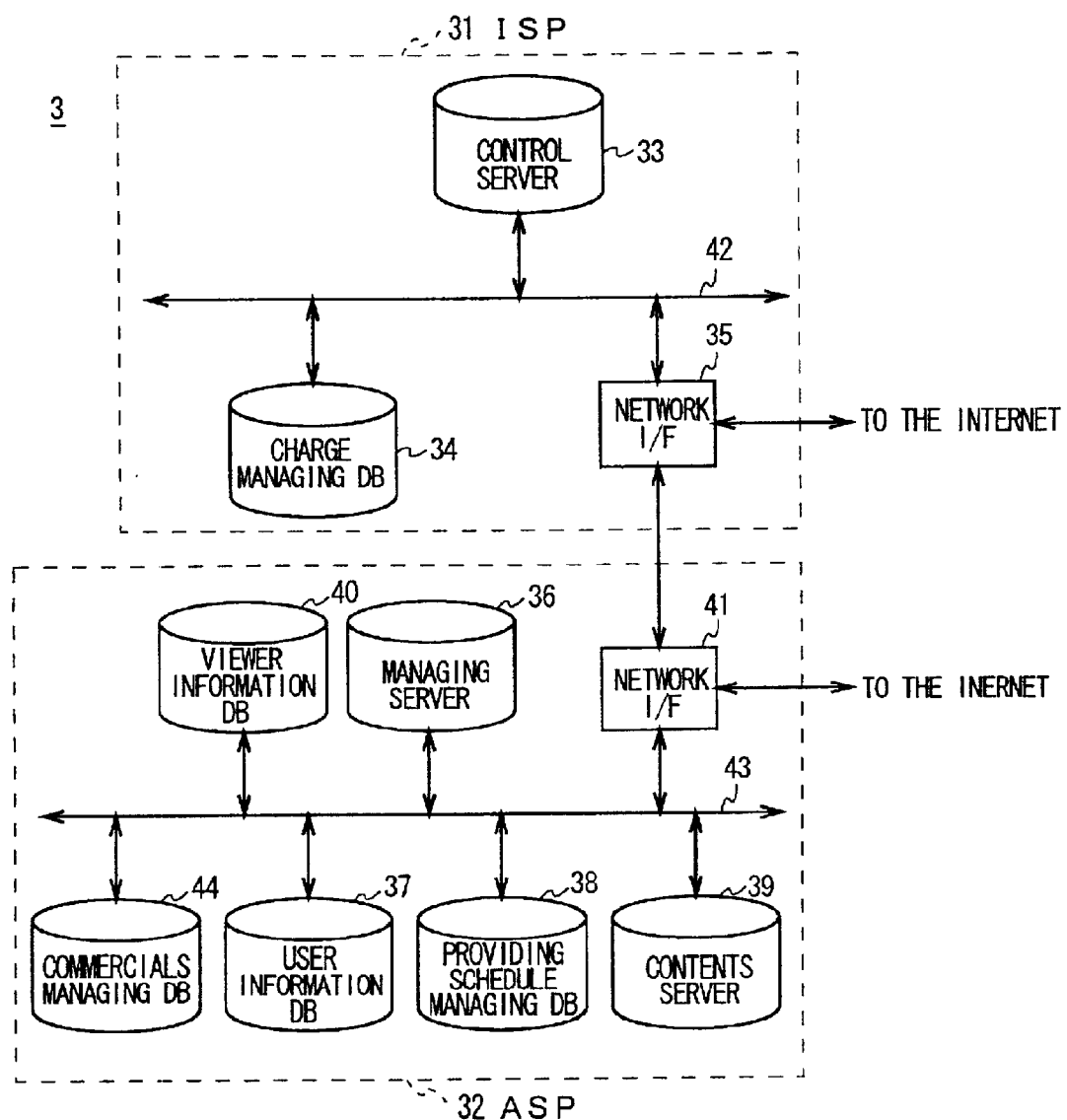
FIG. 7 is a schematic block diagram showing the structure of a content provider.

A content provider 3 consists of an Internet service provider (called "ISP" hereinafter) 31 connecting a user PC 2 to the Internet 5 as shown in FIG. 7, and an application service provider (called "ASP" hereinafter) 32 storing contents supplied from a user PC 2, which are provided to a client PC 4 as required.

An Internet service provider 31 comprises a control server 33 to supervise the whole operation, charge management database 34 managing charges to a user PC 2, and network interface 35 to connect the user PC 2 to a network over the Internet 5, all connected one another over a Local Area Network (LAN) 42, whereby charge management and network control are achieved under the control of the control server 33.

An application service provider 32 comprises a management server 36 to supervise the whole operation, user information database 37 to manage the user information file 25 of a user PC 2, providing schedule management database 38 to manage the providing schedule of a content, content server 39 to store and provide a content, viewer information database 40 to manage viewer information regarding a client PC 4 (viewer) being a watcher and tableener of a content, and commercial management database 44 to store and manage a commercial image supplied from a commercial client 7, matching it with the commercial image identification (ID), all connected one another over the LAN 43, and is designed to conduct user information management, providing schedule management, content storing and providing processing, viewer information management, and commercial providing management under the control of the management server 36.

The content provider 3 receives a user information file 25 transmitted from a user PC 2 when conducting the user registration procedure at the management server 36 through the network interface 35 of the ISP 31 and the network interface 41 of the ASP 32.

Figure 8:
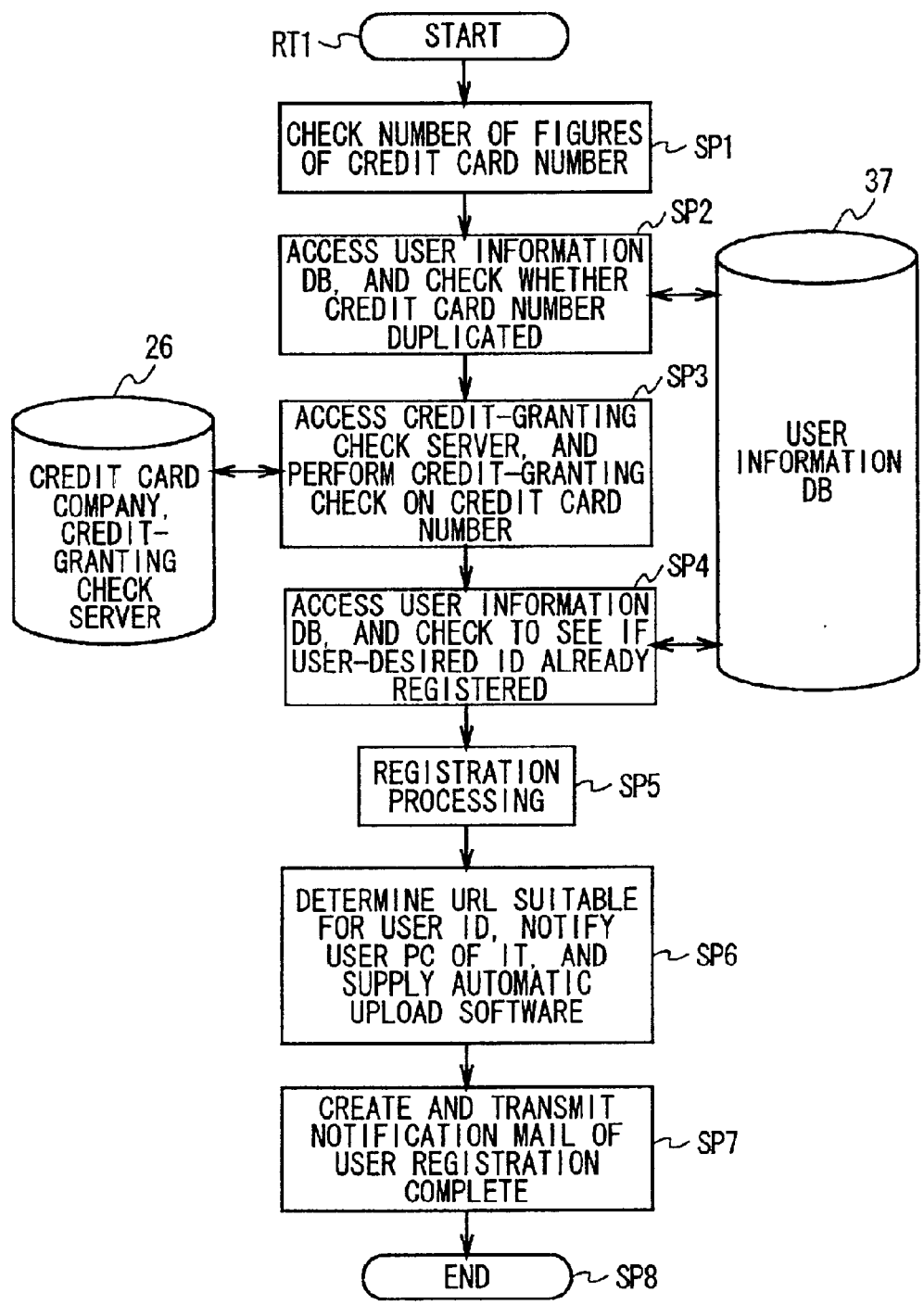
FIG. 8 is a flowchart showing a user registration procedure processing sequence in the management server of an ASP.

Upon receipt of the user information file 25, the management server 36 of the ASP 32 starts a routine RT1 shown in FIG. 8 from the start step and moves to the step SP1, following a user registration procedure program invoked out of the internal hard disk.

At the step SP1 the management server 36 of the ASP 32 reads out the content of the user information file 25 transmitted from a user PC 2 and checks the number of figures of a credit card number, and, when the number of figures turns out to be correct, it proceeds to the next step SP2.

If, however, the credit card number does not consist of correct figures, the management server 36 of the ASP 32 notifies the user PC 2 of that effect over the Internet 5, prompting the user to enter the credit card number in the correct figures.

The management server 36 of the ASP 32 accesses the user information database 37 at the step SP2, and checks to see whether the credit card number of the user information file 25 transmitted is duplicated, and, if not, and only in this case, it proceeds to the next step SP3.

The management server 36 of the ASP 32 accesses the credit-granting check server 26 of a credit card company with its network interface 41 over the Internet 5, and check to see whether that credit card number is valid at the step SP3, and only when the credit card number is in a usable state, it proceeds to the next step SP4.

At the step SP4 the management server 36 of the ASP 32 accesses the user information database 37 again, and checks to see whether desired first to third user IDs are already in use, and only when any of the first to third desired user IDs is not used yet, it proceeds to the next step SP5.

At the step SP5 the management server 36 of the ASP 32 selects the unused user ID most highly desired out of the desired first to third IDs, and after determining a Uniform Resource Locator (URL) matching the user ID, creates a user information DB table 45 as shown in FIG. 9 based on the user information file 25, which is registered anew into a user information database 37. Then, it moves to the step SP6.

Added to the user information DB table 45 newly registered into the user information database 37 are, in addition to the content of the user information file 25, a URL determined matching the user ID, number of accumulated points the content creator has acquired, which is needed for the content creator when receiving a profits give-back, user status (stage 1) indicating the rank of the user proportionate to the number of accumulated points, connection start time and date, connection end time and date, Internet connection charges of the ISP 31 to the Internet 5 at the current time, and service utilization charges for the applied service ("as-much-as-I-like course") of the ASP 32.

In this way, after determining a URL matching a user ID the management server 36 of the ASP 32 has it registered into the user information database 37, whereby granting a content creator a right to writing the movie file of a content created by an individual content creator in the exclusive storage area predetermined in the content server 39 oriented to the URL.

Also, the management server 36 of the ASP 32 manages a user information data table 45 in the user information database DB 37 by the content creator, and increases and renews the number of accumulated points of the content creator in accordance with the number of accesses made by a client PC 4, or alters the user status of the content creator in accordance with the number of accumulated points, or renews various kinds of data in order on connection start time and date, connection end time and date, current Internet connection charges, and service use charges for services applied.

The user status is the rating of a content creator proportionate to the number of accumulated points, rising from the lowest stage 1 to stage 2 to professional stage. Such being the case, the higher the user status of a content creator, more profits give-back he/she may receive.

At the step SP6 the management server 36 of the ASP 32 lets the network interface 41 notify the user PC 2 of a determined user ID as well as a URL matching the user ID over the Internet 5.

At this time the management server 36 of the ASP 32 is to supply the user PC 2 with automatic upload software so programmed as "to automatically connect to the URL matching the user ID and automatically write the movie file of a content created by the user PC 2 in the exclusive memory area in the content server 39 oriented to the URL."

Thus the CPU 10 of the user PC 2 downloads the automatic upload software over the Internet 5, and displays the upload icon 27 of the automatic upload software on the desktop screen 19 (FIG. 4) based on the automatic upload software.

Then, when the upload icon 27 of the desktop screen 19 is clicked by the content creator, the CPU 10 of the user PC 2 connects to the ASP 32 via the ISP 31 over the Internet 5 according to the automatic upload software, and gives to the management server 36 of the ASP 32 the instructions "to automatically write the movie file of a content in the exclusive memory area in the content server 39 oriented to the URL."

Due to the above, the management server 36 of the ASP 32 can write the movie file of the content supplied from the user PC 2 in the exclusive memory area of the content server 39 based on the URL, and reads out the movie file of the content from the exclusive memory area of the content server 39 responding to a demand from a client PC 4, which is provided to the client PC 4.

In this way, once the automatic upload software is downloaded from the ASP 32 with the user ID designated and URL determined according to the user information registration procedure followed by the content creator, the CPU 10 of the user PC 2 makes it increasingly easier to upload the movie file of a content into the exclusive memory area of the content server 39 merely by the content creator performing a click operation on the upload icon 2 without letting the content creator consciously enter the URL.

As a result, in the content providing system 1 it is possible to configure a system as if to open a personal broadcast station offering a content through one's own exclusive channel (this is called "my channel" hereinafter).

With the user registration procedure processing completed the management server 36 of the ASP 32 creates a user registration complete notification mail at the step SP7, which is transmitted from the network interface 41 to the user PC 2 over the Internet 5, completing all the user registration procedure processing at the step SP8.

Meanwhile, the management server 36 of the ASP 32 is to transmit a personal user information DB table 45 as required to the control server 33 of the ISP 31 forming a business alliance, a telephone company (not shown in figures) performing line connection from the user PC 2 to an access point of the ISP31, and an online communication sales company 6.

Consequently the control server 33 of the ISP 31 and the online communication sales company 6, too, are to hold the user information DB table 45.

Accordingly, all the user PC 2 is asked to do is just perform the user registration procedure processing at the very first, and is not forced to follow a troublesome procedure whenever accessing an ISP 31, a telephone company, an online order sales company, and so on.

Incidentally, the management server 36 of the ASP 32 is to obtain a content creator's consent in advance while conducting a user registration procedure to transmitting the content of a personal information DB table 45 to the control server 33 of an ISP 31, a telephone company, and an online communication sales company 6.

(4) Mode of Personal Casting Service

In the content providing system of the present invention 1, there are an on-demand type and a live type as content providing modes in the personal casting service as mentioned before.

The on-demand type is a service wherein a content is stored in advance in the exclusive memory area of the content server 39 oriented to a URL a user PC 2 obtained before at the time of user registration for the personal casting service, and a content is provided to a client PC 4 when asked for through the exclusive memory area of the content server 39 as if through its own exclusive channel (my channel) or a personal broadcast station.

On the other hand, the live type is a service mode wherein many and unspecific registered users of the personal casting service use on a shared basis by dividing by the time schedule the exclusive memory area of the content server 39 designated by URLs by the image channels of particular genres (e.g., wedding channel, music live channel, theater live channel, and event live channel), and wherein the content of a live image reproduced by means of streaming is transmitted to a client PC 4 asking for it via the exclusive memory area of the content server 39 on the real time.

In this way, the live type is designed such that many and unspecific registered users can provide contents freely by reserving a time frame in which to use the exclusive memory area of the content server 39 designated by URLs by the video channel of a specific genre, whereby making it possible to provide a content of a live image to a client PC 4 requiring it as if through a public video channel (this is called "public channel" hereinafter).

(5) Personal Casting Service by On-demand Type

Next, concrete explanation is given on the personal casting service by the on-demand type of the content providing system 1.

(5-1) Content Creation Processing of On-demand Type

The CPU 10 of a user PC 2 (FIG. 3) lets the display units 17 display a capture screen 50 as shown in FIG. 10 by first invoking image capture software out of an HDD 12.

In this case, the CPU 10 of the user PC 2 links a digital video camera 18 connected through the IEEE1394 interface 14 and a capture screen 50 turned on by the image capture software, followed by the setup of the on-demand mode by a content creator clicking a movie mode switching button 53.

Then the CPU 10 of the user PC 2 lets the content creator confirm an image photographed by the digital video camera 18 displayed on the finder display area 51, getting recording started with the digital video camera 18 with the capture button 52 clicked by the content creator, and recording ended with the capture button 52 clicked again.

At this time the CPU 10 of the user PC 2 captures animation data recorded on the digital video camera 18 through the IEEE1394 interface responding to the clicking of the capture button 52, which is once recorded on the HDD 12.

Figure 11:
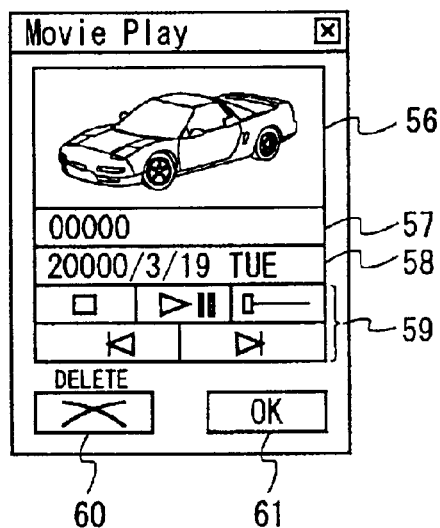
FIG. 11 is a schematic diagram showing a confirmation screen.

Next, the CPU 10 of the user PC 2 lets the display unit 17 show a confirmation screen 55 according to the image capture software as shown in FIG. 11. On this confirmation screen 55 are formed a video display area 56 to display reproduced movie data once recorded on the HDD 12, time code display area 57 to indicate a time code for the movie data being reproduced, date display area 58 to show the date of recording, operation buttons 59 to reproduce, stop, fast forward, or rewind movie data, delete button 60 to delete part or the whole of movie data from the HDD 12, and OK button 61, which enables a content creator to confirm the scenes of movie data recorded on the confirmation screen 55 and to edit them so as to have the only desired scenes kept.

Figure 12:
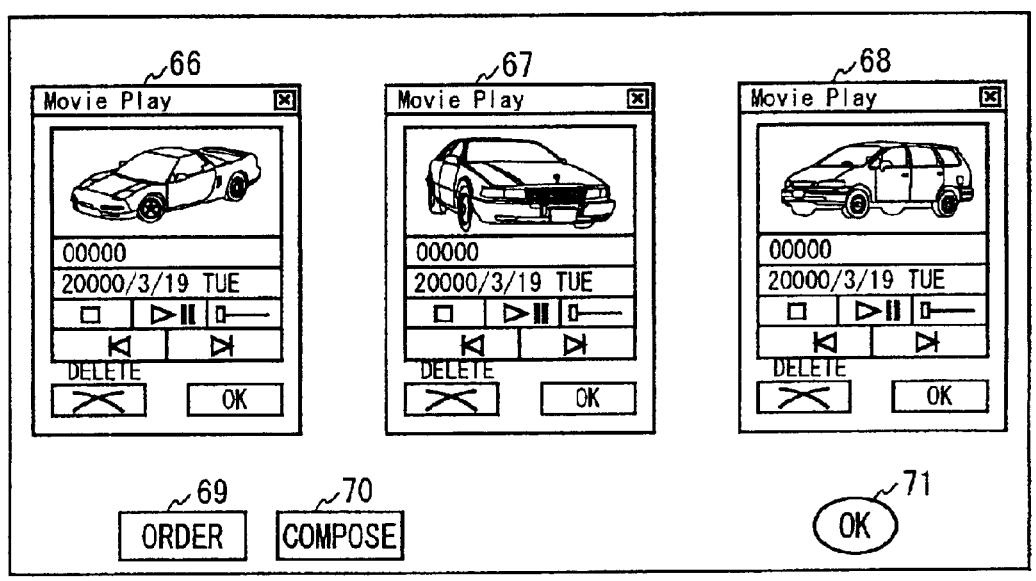
FIG. 12 is a schematic diagram showing an editing screen.

It means, that when the content creator clicks the OK button 61 after confirming and editing the scenes of the recorded movie data on the confirmation screen 55, the CPU 10 of the user PC 2 next invokes edit software out of the HDD 12, and lets the display unit 17 show an edit screen 65 as shown in FIG. 12.

On this edit screen 65 are placed three types of confirmation screen display areas 66 to 68 capable of displaying the confirmation screen 55 for the movie data recorded with the digital video camera 18, an order button 69 to determine a composition order for the three kinds of movie data, a composition button 70 to compose the three kinds of movie data in a determined composition order, and an OK button 71.

Accordingly, the CPU 10 of the user PC 2 determines a composition order for the three kinds of movie data with the order button 69 clicked by the content creator, and creates a movie file by compounding the three kinds of movie data in accordance with the determined composition order responding to the click of the composition button 70, which is once stored on the HDD 12 as a content to be stored in the content server 39 of the ASP 32.

(5-2) Schedule Reservation in the On-demand Type

Figure 13:
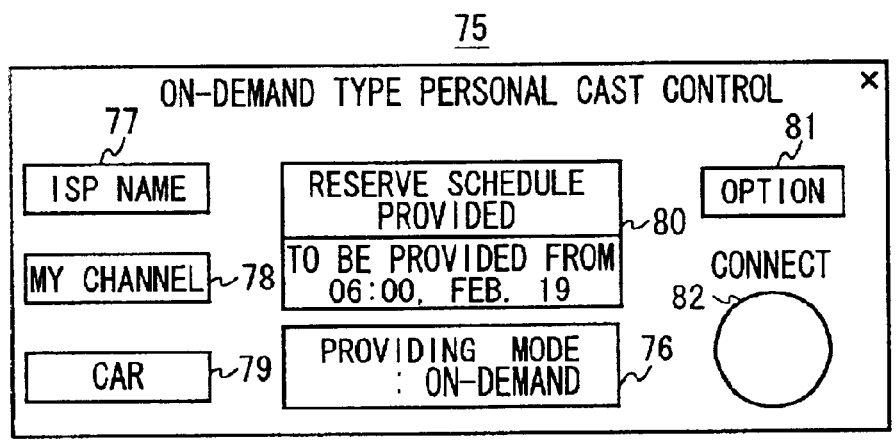
FIG. 13 is a schematic diagram showing an on-demand type personal casting control screen.

Subsequently, when the OK button 71, or upload icon 27 on the desktop screen 19 (FIG. 4) is clicked by the content creator, the CPU 10 of the user PC 2 turns on the automatic upload software downloaded in advance from the ASP 32 at the time of user registration, and lets the display unit 17 display an on-demand type personal casting control screen 75 as shown in FIG. 13.

On the on-demand type personal casting control screen 75 appear the letters "On-Demand" in the mode display area 76 indicating that the on-demand mode is set up currently, and the company name of the ISP 31 in an ISP name display area 77 automatically as well as the letters "My Channel" in an ASP channel display area 78, which is set up automatically in the on-demand mode.

Figure 14:
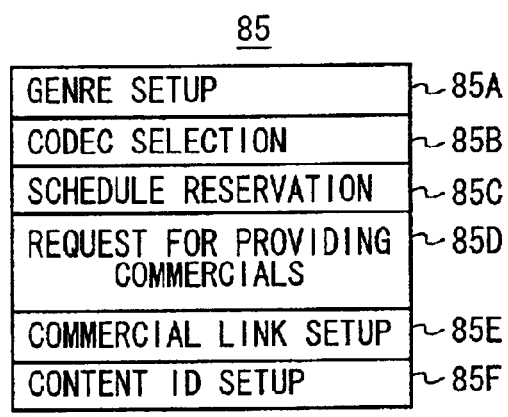
FIG. 14 is a schematic diagram showing a pulldown menu.

Also, an option button 81 is located on the on-demand type personal casting control screen 75, and when this option button 81 is clicked by the content creator, the CPU 10 of the use PC 2 displays a pulldown menu 85 as shown in FIG. 14 on the on-demand type personal casting control screen 75 based on the automatic upload software.

On this pulldown menu 85 are placed a genre setup button 85A to appoint a video genre of a content created by the content creator, CODEC selection button 85B to select a codec when providing a content to a client PC 4 requiring it, schedule reservation button 85C to enable the content creator to freely determine a content providing schedule, commercial providing request button 85D to provide a commercial image affixed to the head portion of a content as desired by the content creator, commercial link setup button 85E to link to a homepage of, for example, a commercial sponsoring company from a commercial video, and content ID setup button 85F to set up a content ID suitable for a content.

Figure 15:
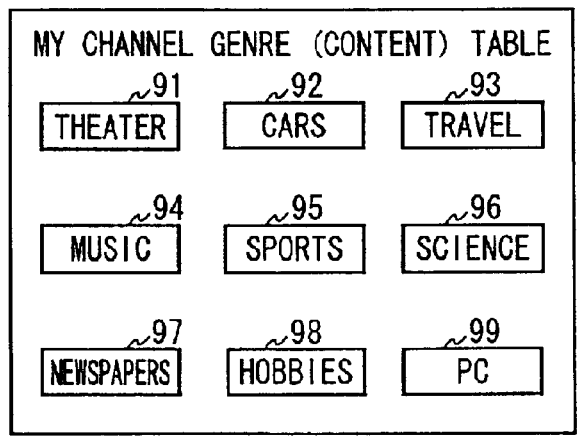
FIG. 15 is a schematic diagram showing my channel genre screen.

When the genre setup button 85A is clicked by the content creator out of the pulldown menu 85, the CPU 10 of the user PC 2 lets the display unit 17 indicate my channel genre display screen 90 as shown in FIG. 15 based on the automatic upload software.

On the my channel genre screen 90 are displayed category icons 91 to 99 assorted by the video category for the content creator to appoint a video genre of the content. When any one ("car" category icon 92 for example) of them is clicked by the content creator, the CPU 10 of the user PC 2 acknowledges the video genre of a content as "car", the result of which is once retained on the HDD 12 as the category data.

Figure 16:
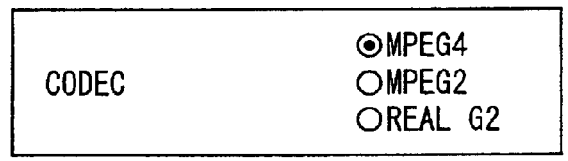
FIG. 16 is a schematic diagram showing a codec selection screen.

Also, when the CODEC selection button 85B out of the pulldown menu 85 is clicked by the content creator, the CPU 10 of the user PC 2 lets the display unit 17 display a codec selection screen 100 as shown in FIG. 16 on a basis of the automatic upload software.

On this CODEC selection screen 100 is to be selected any one of, for example, Moving Picture Experts Group (MPEG) 4, MPEG 2, or Real G2 as a codec when providing a content to a client PC 4, and so, if a check mark is put on the MPEG 4 for example by the content creator, the CPU 10 of the user PC 2 recognizes the type of a codec as MPEG 4, the result of which is once retained on the HDD 12 as the codec type data.

Figure 17:
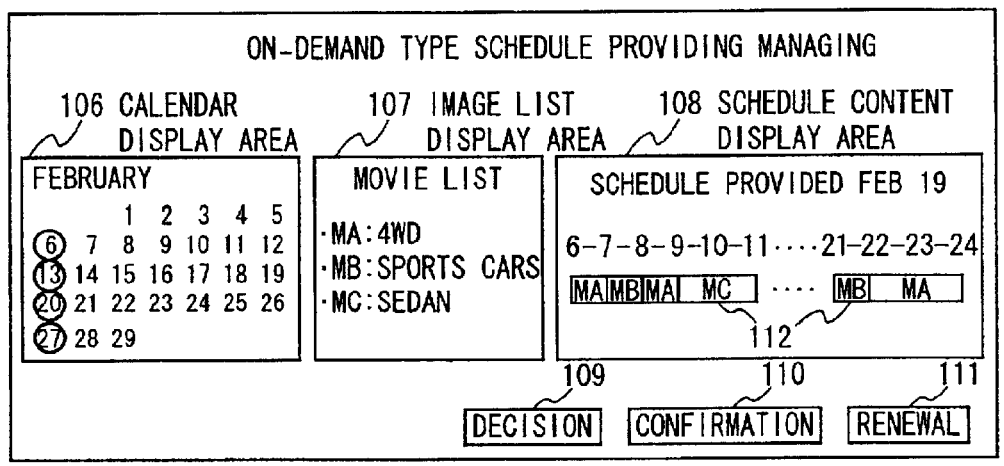
FIG. 17 is a schematic diagram showing an on-demand type providing schedule management screen.

Furthermore, when the schedule reservation button 85C out of the pulldown menu 85 is clicked by the content creator, the CPU 10 of the user PC 2 lets the display unit 17 display an on-demand type providing schedule management screen 105 as shown in FIG. 17 on a basis of the automatic upload software.

On this on-demand type providing schedule management screen 105 are placed a calendar display area 106, video table display area 107, schedule content display area 108, decision button 109, schedule content confirmation button 110, and schedule content renewal button 111.

When the content creator click-selects a desired date (e.g., February 19) when a content is to be provided in the calendar display area 106 on this on-demand type providing schedule management screen 105, the CPU 10 of the user PC 2 acknowledges a providing date desired by the content creator as February 19, consequently having February 19 once retained on the HDD 12 as the providing date data, and the providing date (February 19) automatically written and displayed on the title area in the schedule display area 108.

And, when a time schedule appoint bar 112 is appointed by the content creator by clicking to a desired start time and an end time in the schedule content display area 108 on the on-demand type providing schedule management screen 105, the CPU 10 of the user PC 2 acknowledges the time schedule frame from start time to end time, and simultaneously displays the time schedule appoint bar 112 segmented by time schedule frames appointed by the content creator.

That is to say, the time schedule bar 112 in the schedule content display area 108 is displayed, segmented into; first time schedule frame from 6:00 to 6:59:59, second time schedule frame from 7:00 to 7:59:59, third time schedule frame from 8:00 to 8:59:59, fourth time schedule frame from 9:00 to 10:59:59, fifth time schedule frame from 21:00 to 21:59:59, and sixth time schedule frame from 22:00 to 23:59:59.

Subsequently, when a desired sign of the kinds (MA, MB, or MC) indicating the kinds of videos (e.g., 4WD, sports car, electric car) is clicked out of the video table display area 107 with a desired time schedule frame on the time schedule appoint bar 112 click-selected by the content creator at the same time, the CPU 10 of the user PC 2 recognizes the video kind of a content to be offered out of the selected first to sixth time schedule frames by the kind sign (MA, MB, or MC), and the recognized kind signs are displayed within the time schedule frames respectively on the time schedule appoint bar 112.

Then, when the decision button 109 is clicked on the on-demand type providing schedule management screen 105, the CPU 10 of the user PC 2 creates a providing schedule program to provide a content in the determined kind reserved for each of the first to sixth time schedule frames on the time schedule appoint bar 112, which is once retained on the HDD 12.

That is, the providing schedule program is programmed to provide the content of "4WD" corresponding to the kind sign MA when it receives a demand for a time within the first time schedule frame on the time schedule appoint bar 112 from a client PC 4; to provide the content of "sports car" corresponding to the kind sign MB when it receives a demand for a time within the second time schedule frame from a client PC 4; to provide the content of "4WD" corresponding to the kind sign MA when it receives a demand for a time within the third time schedule frame from a client PC 4; to provide the content of "sedan" corresponding to the kind sign MC when it receives a demand for a time within the fourth time schedule frame from a client PC 4; to provide the content of "sports car" corresponding to the kind sign MB when it receives a demand for a time within the fifth time schedule frame from a client PC 4; and to provide the content of "4WD" corresponding to the kind sign MA when it receives a demand for a time within the sixth time schedule frame from a client PC 4.

Figure 18:
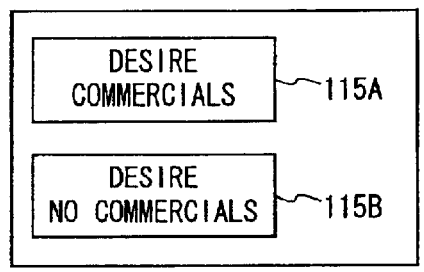
FIG. 18 is a schematic diagram showing a commercial providing request screen.

Furthermore, when the commercial providing request button 85D from among the pulldown menu 85 (FIG. 14) is clicked by the content creator, the CPU 10 of the user PC 2 lets the display unit 17 show a commercial providing request screen 115 as shown in FIG. 18 based on the automatic upload software.

On this commercial providing request screen 115 are located a commercial desired button 115A and a commercial undesired button 115B to ask the content creator whether he/she wishes to provide a client PC 4 with a commercial video affixed to the head portion of his/her content, so that only when the commercial desired button 115A is clicked by the content creator, the CPU 10 of the user PC 2 creates commercial desired data indicating that a commercial video is desired to be affixed to the content, which is once retained on the HDD 12.

Figure 19:
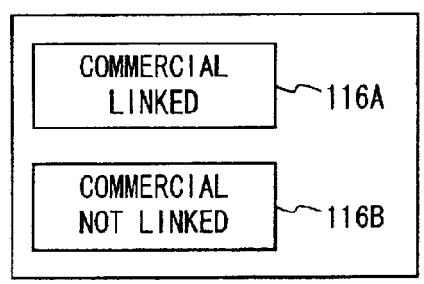
FIG. 19 is a schematic diagram showing a commercial link setup screen.

Furthermore, when the commercial link setup button 85E out of the pulldown menu 85 is clicked by the content creator, the CPU 10 of the user PC 2 lets the display unit 17 display a commercial link setup screen 116 as shown in FIG. 19 based on the automatic upload software.

On this commercial link setup screen 116 are placed a commercial link Yes button 116A to set up an anchor to link to the homepage of a commercial sponsoring company for example from the commercial video initially affixed to the content, and a commercial link No button 116B not to set up linkage from the commercial video, and only when the commercial link Yes button 116A is clicked by the content creator, the CPU 10 of the user PC 2 creates commercial link data to the effect that an anchor is desired to be set up to link to a given homepage from the commercial video, which is once retained on the HDD 12.

Furthermore, when the content ID setup button 85F is clicked by the content creator out of the pulldown menu 85, the CPU 10 of the user PC 2 lets the display unit 17 show a content ID setup screen 117 as shown in FIG. 20 based on the automatic upload software.

A content ID input area 117A being formed on this content ID setup screen 117, when the execute key is depressed with a given content ID matching a content entered by the content creator, the CPU 10 of the user PC 2 acknowledges the content ID, which is once retained on the HDD 12.

In this way, the CPU 10 of the user PC 2 sets up various conditions for offering a content according to the pulldown menu 85 displayed by clicking the option button 81 on the personal casting control screen 75, and newly creates an on-demand type providing schedule control file 120 as shown in FIG. 21 based on the various condition kinds of data (category data, codec kind data, providing schedule program, commercial desired data, commercial link data, and content ID) once recorded on the HDD 12, and the content of the user information file 25 created when the user registration procedure processing was performed, which is once recorded on the HDD 12.

That is to say, in the on-demand type providing schedule control file 120 once retained on the HDD 12 are stored an ISP name (***) as an "ISP connection point" used in connecting to the Internet 5, a channel type (my channel) as "ASP channel" at the time when the ASP 32 provides content, content ID (*) determined by the content creator as "content ID", CODEC (MPEG 4) as "CODEC" at the time of providing content, video category (car) as "video genre", content (various conditions such as "schedule to be provided from 6:00 February 19") of providing schedule data as "providing schedule", with/without commercial providing request (with commercial) as "commercial request", with/without commercial link (without commercial link) as "commercial link", user ID (kimkim) as "user ID at the time of user registration, and password (*****) as "password" at the time of user registration.

Accordingly, the CPU 10 of the user PC 2 lets the video genre display area 79 on the on-demand type personal casting control screen 75 (FIG. 13) display the letters "car" indicating the video category of a content based on the on-demand type providing schedule control file 120, and the letters "to be provided from 6:00 February 19" on the providing schedule reservation area 80.

It has been explained in effect that commercial link and a content ID are set up by the user PC 2 with the use of the pulldown menu 85, however, they may be set up automatically on the side of the management server 36 of ASP 32.

As to the commercial link setup for example, when a link appointment has been made in advance by a commercial client 7, commercial link is made automatically to a commercial (commercial) determined to be provided by a client PC 4.

Also, when an image is uploaded for example, a content ID is set up automatically on the side of the management server 36 of the ASP 32, thus making it possible to manage an image on the management server 36 of the ASP 32 with this ID.

(5-3) Connection Processing to ASP in On-Demand Type

Next, when the content of the on-demand type personal casting control screen 75 (FIG. 13) is confirmed by the content creator with the connect button 82 clicked by the content creator, the CPU 10 of the user PC 2 starts a routine RT2 shown in FIG. 22 at the start step following the automatic upload software, and moves on to the step SP11.

At the step SP11 the CPU 10 of the PC 2 logs into the ASP 32 from the network interface 16 (FIG. 3) over the Internet 5 and through the ISP 31, and accesses the user information database 37 of the ASP 32 to obtain authentication based on the user ID, password, and so on, and then moves to the step SP12.

Having obtained authentication of the ASP 32 at the step SP12, the CPU 10 of the PC 2 reads out an on-demand type providing schedule control file 120 and the movie file of the content from the HDD 12, which are transferred to the management server 36 from the network interface 16 via the Internet 5, network interface 35 of the ISP 31, and network interface 41 of the ASP 32, and proceeds to the next step SP13, terminating the processing.

In this way the CPU 10 of the PC 2 is designed to be capable of uploading the on-demand type providing schedule control file 120 and the movie file of the content into the ASP 32 following the automatic upload software.

Upon receipt of the on-demand type providing schedule control file 120 and the movie file of the content through the network interface 41, the management server 36 of the ASP 32 registers the on-demand type providing schedule control file 120 into the providing schedule management database 38, and stores the movie file of the content in the exclusive memory area of the content server 39 oriented to the URL obtained at the time of user registration by the user PC 2.

In the case of a commercial providing request "with commercial" as the content of the on-demand type providing schedule control file 120, the management server 36 of the ASP 32 creates a movie file with commercial by affixing a commercial video supplied in advance by the commercial client 7 and stored in the commercial control database 44 to the head portion of the movie file of the content, which is retained in the content server 39 once again.

In the meantime, the control server 33 of the ISP 31 charges to the user ID of the user PC 2 an Internet connection charge occurring while the user PC 2 is uploading the on-demand type providing schedule control file 120 and the movie file of the content into the ASP 32, and renews the charge data of the charge management database 34.

Also, the management server 36 of the ASP 32 charges the service use charge of the ASP 32 to the user ID of the user PC 2, of which data is transmitted to the charge management database 34 via the network interface 41 and the network interface 35 of the ISP 31, and renews the charge data of the charge management database 34.

Incidentally, when the user PC 2 has a contract for a fixed charge service called "as-much-as-I-like course", the control server 36 of the ASP 32 records in the user information database 37 the connection time from connection start time and date to connection end time and date only without performing charge processing with the service use charge remaining fixed.

In the case where the content of the on-demand type providing schedule control file 120 is confirmed after the on-demand type providing schedule control file 120 and the movie file of the content are uploaded into the ASP 32, the only thing the content creator is to do is just click the schedule content confirmation button 110 on the on-demand type providing schedule management screen 105 (FIG. 17).

Figure 23:
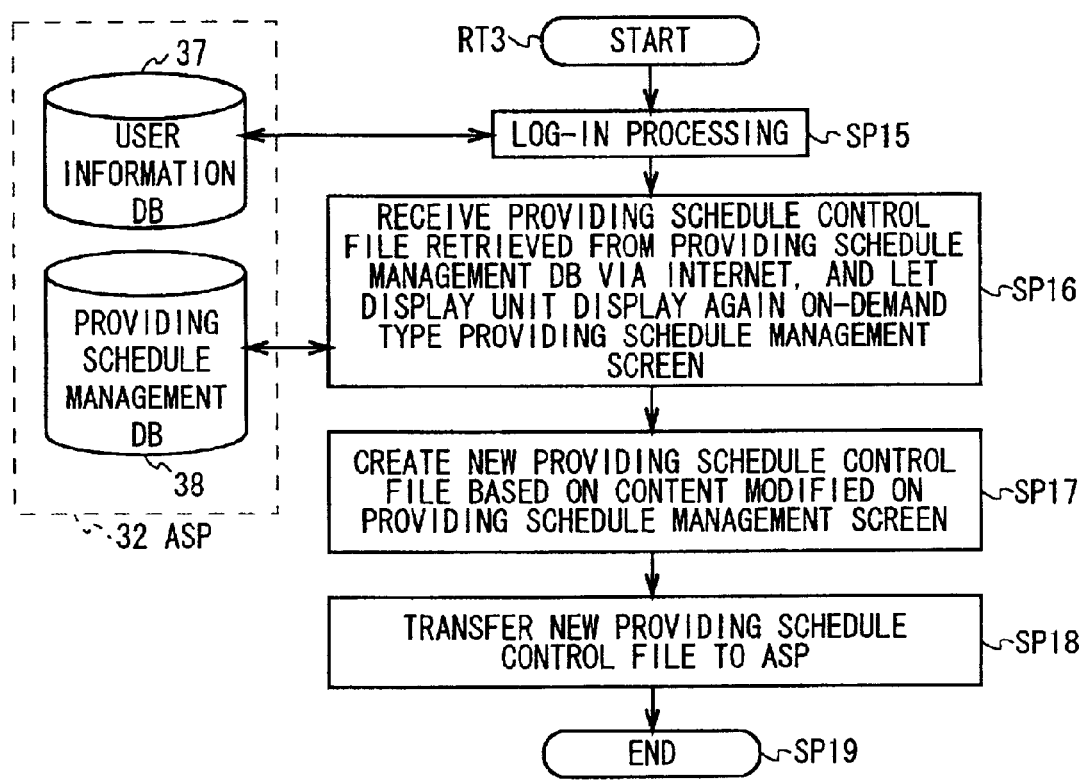
FIG. 23 is a flowchart showing the confirmation and changing processing sequence of a providing schedule.

At this time the CPU 10 of the PC 2 starts a routine RT3 shown in FIG. 23 at the start step, and proceeds to the step SP15 following the automatic upload software.

With the schedule content confirmation button 110 clicked by the content creator the CPU 10 of the PC 2 performs log-in processing to the ASP 32 from the network interface 16 (FIG. 3) over the Internet 5 and ISP 31 at the step SP15, and obtains authentication on the user ID, and password, etc., by accessing the user information database 37 of the ASP 32, and then proceeds to the next step SP16.

The management server of the ASP 32 having obtained authentication on the user ID, and password, etc., the CPU 10 of the PC 2 is supplied with the on-demand type providing schedule control file 120 from the providing schedule management database 38 at the step SP16, and lets the display unit 17 show the on-demand type providing schedule management screen 105 (FIG. 17) once again based on the on-demand type providing schedule control file 120.

Like this, the CPU 10 of the PC 2 lets the display unit 17 display the on-demand type providing schedule management screen 105, so that the content creator can reconfirm the content of the on-demand type providing schedule control file 120.

In the case that the content creator tries to modify the content of the on-demand type providing schedule control file 120 later, when the decision button 109 is clicked after the modification of the providing schedule is made on the on-demand type providing schedule management screen 105, the CPU 10 of the PC 2 proceeds to the next step SP17.

At the step SP17 the CPU 10 of the PC 2 creates a new providing schedule based on the content modified on the on-demand type providing schedule management screen 105, based on which a new on-demand type providing schedule control file 120 is created, and then it proceeds to the next step SP18.

When the renewal button 111 on the on-demand type providing schedule management screen 105 is clicked by the content creator, the CPU 10 of the PC 2 transfers the new on-demand type providing schedule control file 120 to the ASP 32 over the Internet 5, and proceeds to the next step SP19, terminating the processing.

As a result, the control server 36 of the ASP 32 renews the providing schedule management database 38 with the new on-demand type providing schedule control file 120, based on which the providing schedule of the content is to be managed in future.

(5-4) Content Providing Processing in On-demand Type

A client PC 4, too, can make user registration to a content provider 3 when receiving a content similarly as a user PC 2 can, and in this case a user registration procedure should be made following the user registration processing procedure of the routine RT1 (FIG. 8), then a viewer information file with respect to the user ID and password of the client PC 4 is registered in the viewer information database 40 by the control server 36 of the ASP 32.

In the case that user registration is not made, a client PC 4 may access directly, as a visitor, the web site of the personal casting service provided by the ASP 32. The only user-registered client PC 4 is allowed to make a contribution easily to the content creator of a content, by which the client is moved, or with which the client sympathizes, or which the client feels excellent. Explanation is given on the contribution later.

Figure 24:
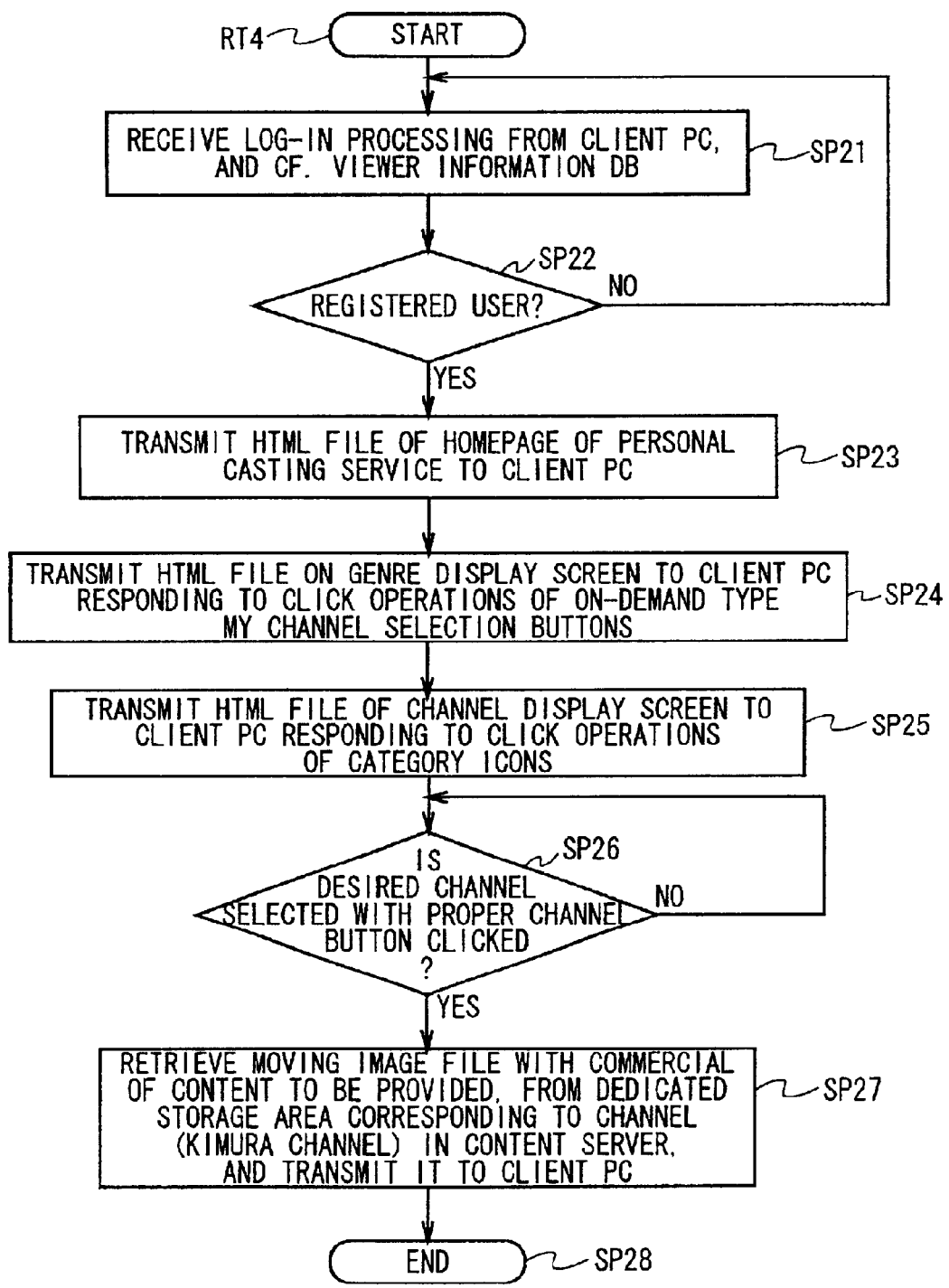
FIG. 24 is a flowchart showing a casting processing sequence in the on-demand type.

In practice, in such a case that a content is provided to a user-registered client PC 4 in the on-demand type for example, the management server 36 of the ASP 32 starts a routine RT4 shown in FIG. 24 at the start step following a content providing program invoked from the hard disk installed inside of it, and then proceeds to the step SP21.

At the step SP21 the management server 36 of the ASP 32 is logged in by the client PC 4 and proceeds to the next step SP22, referring to the viewer information file in the viewer information database 40 based on of the user ID and password sent from the client PC 4.

As a result of having referred to the viewer information file in the viewer information database 40 based on the user ID and password at the step SP22, the management server 36 of the ASP 32 judges whether the client PC 4 logging in is a legitimate registered user.

A negative result, if obtained here, means that the user ID and password do not match those registered in the viewer information database 40, then the management server 36 of the ASP 32 returns to the step SP21, and lets the client PC 4 perform log-in processing again, prompting the client PC 4 to enter the correct user ID and password.

On the other hand, if an affirmative result is obtained at the step SP22, it means that the client PC 4 is a regular registered user, then the management server 36 of the ASP 32 moves to the next step SP23.

At the step SP23 the management server 36 of the ASP 32 reads the HTML file of a homepage in the personal casting service from the content server 39 responding to an access by the client PC 4, which is transmitted to the client PC 4 from the network interface 41 over the Internet 5.

Figure 25:
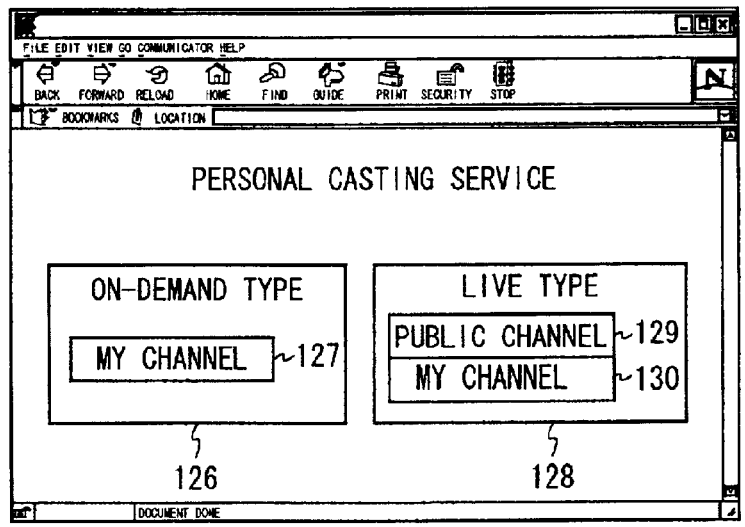
FIG. 25 is a schematic diagram showing the homepage screen of a personal casting service.

The client PC 4 having almost the same structure as the user PC 2 has, its CPU (not shown in figure) receives the HTML file of a homepage in the personal casting service transmitted from the ASP 32, which is displayed on the display unit as a homepage screen 125 (Netscape Communication Corp's Netscape navigator screen) as shown in FIG. 25.

On this homepage screen 125 are placed an on-demand type my channel selection button 127 to receive a supply of a content on an on-demand mode selection display area 126 through my channel as well as a live type public channel selection button 129 to receive a supply of a content of a live video on a live mode selection display area 128 through a public channel, and a live type my channel selection button 130 to receive a supply of a content of a live video through my channel.

When the on-demand type my channel selection button 127 is clicked by the user on this homepage screen 125, the CPU of the client PC 4 transmits to the management server 36 of the ASP 32 over the Internet 5 a mode selection signal indicating the selection of the on-demand type my channel selection button 127.

At the step SP24 the management server 36 retrieves an HTML file constituting a genre table screen for my channel from the content server 39 based on the mode selection signal transmitted from the client PC 4, which is transmitted to the client PC 4 from the network interface 41 over the Internet 5.

Figure 26:
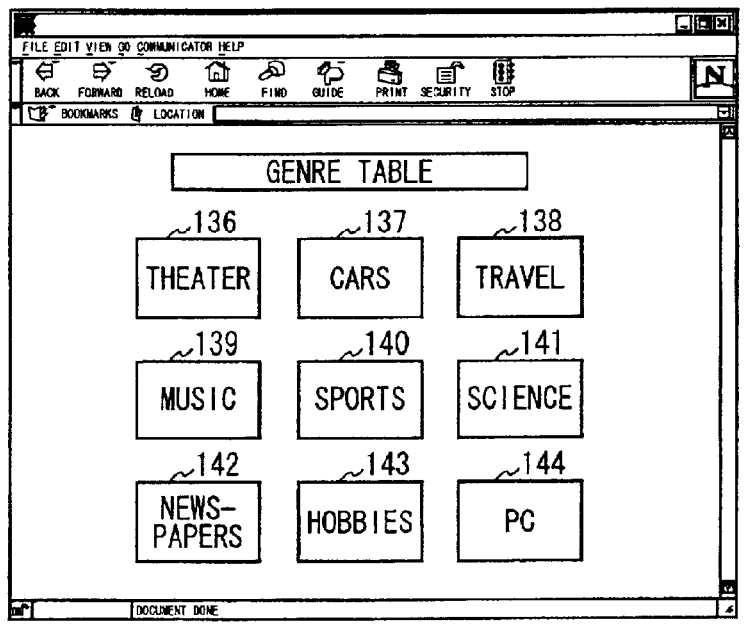
FIG. 26 is a schematic diagram showing the genre table screen for my channel.

Thus, the CPU of the client PC 4 receives the HTML file of the genre table screen for my channel transferred from the ASP 32, which is displayed on the display unit as the genre table screen 135 for my channel as shown in FIG. 26.

This genre table screen 135 for my channel is almost similar to the genre table screen 90 (FIG. 15) for my channel the content creator uses in selecting a video genre of content, with a category icon 136 to 144 assigned to each video category displayed on it.

When any one (e.g., "car" category icon 137) of those category icons 136 to 144 is clicked by the user of the client PC 4 on the genre table screen 135 for my channel, the CPU of the client PC 4 transmits to the management server 36 over the Internet 5 a genre selection signal corresponding to the "car" category icon 137.

At the step SP25 the management server 36 of the ASP 32 retrieves the HTML file of the channel display screen as to the video category "car" from the content server 39 based on the genre selection signal transmitted from the client PC 4, which is transmitted to the client PC 4 from the network interface 41 over the Internet 5.

Figure 27:
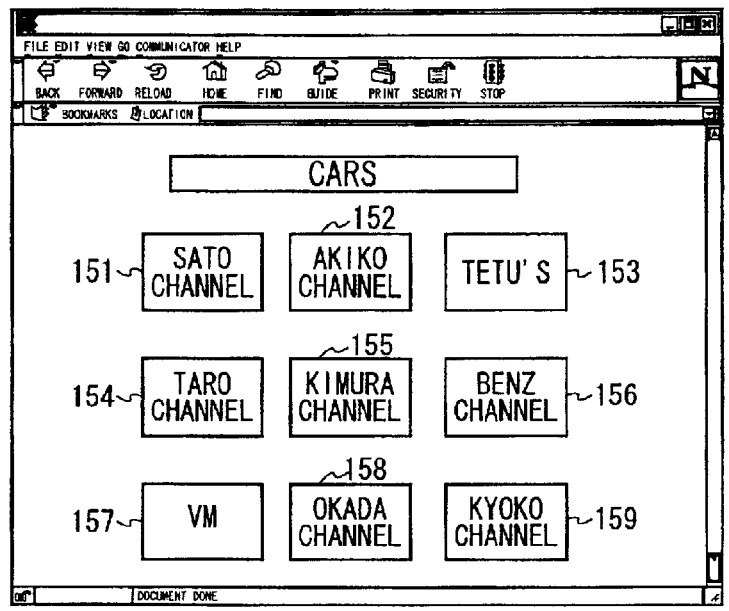
FIG. 27 is a schematic diagram showing a channel display screen regarding a "car" video genre.

In this way the CPU of the client PC 4 receives the HTML file of the channel display screen transmitted from the ASP 32, which is displayed on the display unit as a channel display screen 150 regarding the video genre "car" as shown in FIG. 27.

On this channel display screen 150 are displayed channel buttons 151 to 159, each assigned with a channel name (Kimura Ch) set up in the user information DB table 45 (FIG. 9) at the time when the content creator conducted user registration processing. A user is to click-select a desired channel button (e.g., Kimura Ch) out of them.

At the step SP26 the management server 36 of the ASP 32 judges whether a desired channel button 155 is click-selected by the user of the client PC 4 watching the channel display screen 150.

In this case, the CPU of the client PC 4 transmits to the management server 36 of the ASP 32 over the Internet 5 a content ID set up responding to the channel button 155 selected by the user.

Accordingly, the management server 36 of the ASP 32 acknowledges that a desired channel button 155 is clicked at the place where the content ID is received, and captures a URL matching the channel button 155, referring to the on-demand type providing schedule control file 120 stored in the providing schedule management database 38 based on the content ID.

A negative result, if obtained at this step SP26, means that none of the channel buttons 151 to 159 displayed on the channel display screen 150 is selected by the user, and then the management server 36 of the ASP 32 stands by until any one of the channel buttons 151 to 159 is selected.

If an affirmative result is obtained at the step SP26, however, it means that a user-desired channel button 155 is click-selected out of the channel buttons 155 to 159, and then the management server 36 of the ASP 32 proceeds to the next step SP27.

Upon receipt of a content ID matching a clicked channel (e.g., Kimura CH) 155 from the client PC 4 over the Internet 5, the management server 36 of the ASP 32 refers to the on-demand type providing schedule control file 120 based on the content ID, and retrieves a movie file with commercial of a certain kind (MA, MB, or MC) of a video to be provided at the timing of the channel button 155 clicked from the exclusive memory area in the content server 39 based on a URL matching the content ID, which (retrieved movie file) is transmitted to the client PC 4 over the Internet 5, and then it goes to the next step SP28, terminating the processing.

In practice, if a channel button (e.g., Kimura Ch) 155 is clicked by the user at 10:55 a.m. on February 19 for example, the management server 36 of the ASP 32 refers to the on-demand type providing schedule control file 120 and transmits to the client PC 4 the movie file with commercial of a movie kind "Sedan" in accordance with the providing schedule on the schedule content display area 108 appointed on the on-demand type providing schedule management screen 105 (FIG. 17).

Figure 28:
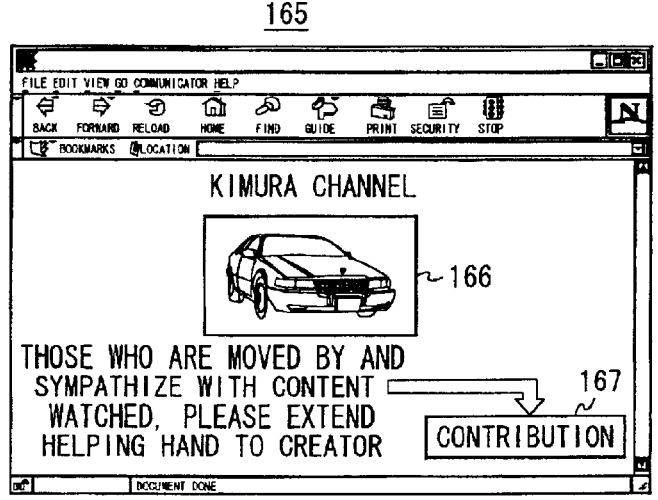
FIG. 28 is a schematic diagram showing a content display screen indicating content matching a selected channel button.

Due to this, the client PC 4 lets the display unit display a content display screen 165 as shown in FIG. 28 based on the movie file with commercial received, and a commercial movie is first displayed in a display area 166 formed in the center of the content display screen 165, with an animated image of a car "sedan" displayed subsequently.

In this way the management server 36 of the ASP 32 is to transmit to the client PC 4 one kind of a movie file with commercial to be provided at the timing when a channel button 151 to 159 is clicked by the user of the client PC 4 in accordance with the content of the on-demand type providing schedule control file 120.

Thus, the management server 36 of the ASP 32 is capable of transmitting a content swiftly without delay, consuming a narrower bandwidth of a transmission line, even when transmitting the same content to a plurality of clients PC4 almost at the same time responding to their demands, compared to the case where a plurality of contents need to be transmitted simultaneously at a certain timing.

Also, at this time the management server 36 of the ASP 32 counts the number of the clicks by a client PC 4 as the access number every time a movie file with commercial is provided to a client PC 4 responding to the click operation.

In this case, the access times counted being equivalent to the number of people watching the commercial video, the management server 36 of the ASP 32 is designed to give points proportionate to the number of access times to the content creator, so that a fair profits give-back goes to the content creator who creates a most frequently accessed content, with the points of that content creator registered in the user information DB table 45 matching the user ID, which is stored in the user database 37.

(6) Personal Casting Service in Live Type

Next, concrete explanation is given on the personal casting service by the live type of a content providing system 1.

(6-1) Schedule Reservation in the Live Type

In the live type, to provide a content of a live video on the real time it is not necessary to create the movie file of a content and to have it stored in the content server 39 of the ASP 32 in advance as done in the on-demand type.

In the live type, however, since a content is to be provided through a common public channel (wedding ceremony channel, music live channel, theater live channel, or event live channel), it is necessary to reserve in advance a time schedule frame in which to use a public channel.

To reserve a time schedule frame in which to use a public channel is to reserve a time schedule frame in which to use the exclusive memory area of the content server 39 assigned, oriented to the URL of each public channel.

In practice, when the ASP 32 provides a content of a live video, it once writes the movie file of a live video sent from a user PC 2 in the exclusive memory area of the content server 39 appointed with the URL for each public channel, which is retrieved to be output.

It means that to make a reservation for a time schedule frame in which to use a public channel the CPU 10 of the PC 2 first lets the display unit 17 display a capture screen 50 (FIG. 10) by turning the image capture software as is the case with the on-demand type.

Figure 29:
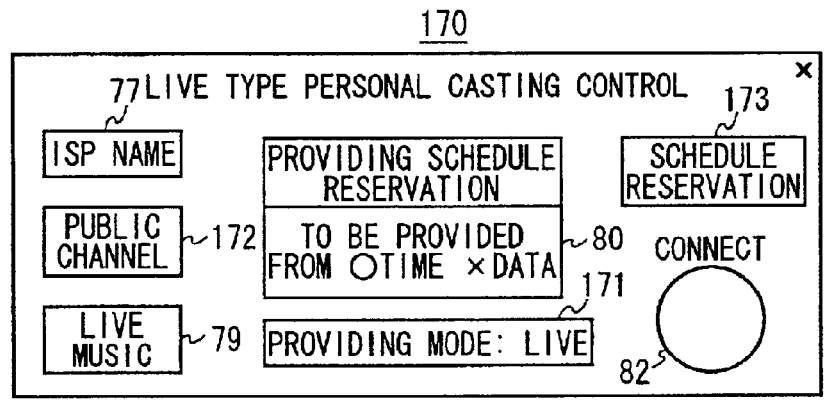
FIG. 29 is a schematic diagram showing a live type personal casting control screen.

And, after the live mode is set up responding to the click operation of the movie mode switching button 53 on the capture screen 50, the CPU 10 of the PC 2 invokes the automatic upload software downloaded in advance from the ASP32 at the time of user registration, and lets the display unit 17 display a live type personal casting control screen 170 as in FIG. 29, which has the same reference numerals as those assigned to the corresponding parts in FIG. 13.

On the live type personal casting control screen 170 is displayed the letters "LIVE" indicating that the live mode is set up currently on the mode display area 171 as well as the letters "PUBLIC CHANNEL" set as default in the live mode on the ASP channel display area 172, and is formed a schedule reservation button 173 in place of the option button 81 on the on-demand type personal casting control screen 75 (FIG. 13).

On the live type personal casting control screen 170 is also indicated the name of a public channel (e.g., "MUSIC LIVE") on a video genre display area 79 determined by the content creator at the time of reserving a time schedule frame, out of four (4) types of channels: wedding ceremony channel, music live channel, theater live channel, and event live channel set up as public channels.

Furthermore, on the live type personal casting control screen 170 is displayed the providing time and date of a content of a live video reserved by the content creator, in the providing schedule reservation display area 80 as done in the on-demand type.

Figure 30:
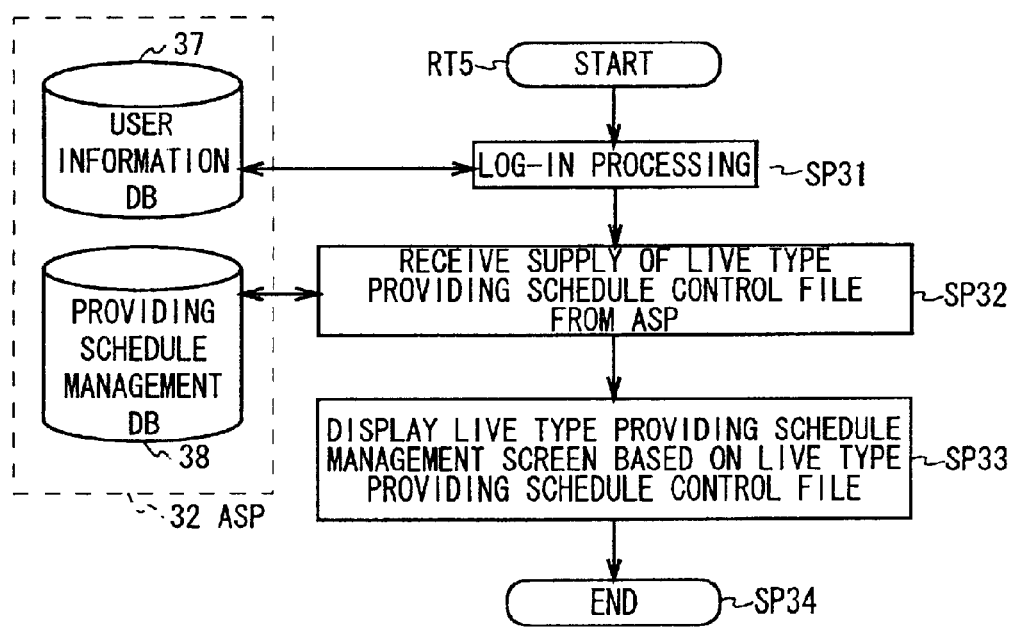
FIG. 30 is a flowchart showing the display processing sequence of a live type providing schedule management screen.

In the live type personal casting control screen 170 described above, when the schedule reservation button 173 is clicked by the content creator, the CPU 10 of the PC 2 turns on the automatic upload software downloaded from the ASP 32, and starts a routine RT5 shown in FIG. 30, at the start step, and proceeds to the step SP31.

At the step SP31 the CPU 10 of the PC 2 logs in to the ASP 32 from the network interface 16 (FIG. 3) over the Internet 5 and through the ISP 31, and obtains authentication based on the user ID, and password, etc., by accessing the user information database 37 of the ASP 32, then moves on to the next step SP32.

At the step SP32 the CPU 10 of the PC 2 receives over the Internet 5 a live type providing schedule control file on the reservation status of the public channel retrieved by the management server 36 of the ASP 32 from the providing schedule management database 38, which is recorded on the HDD, and it proceeds to the step SP33.

Figures 31, 32:
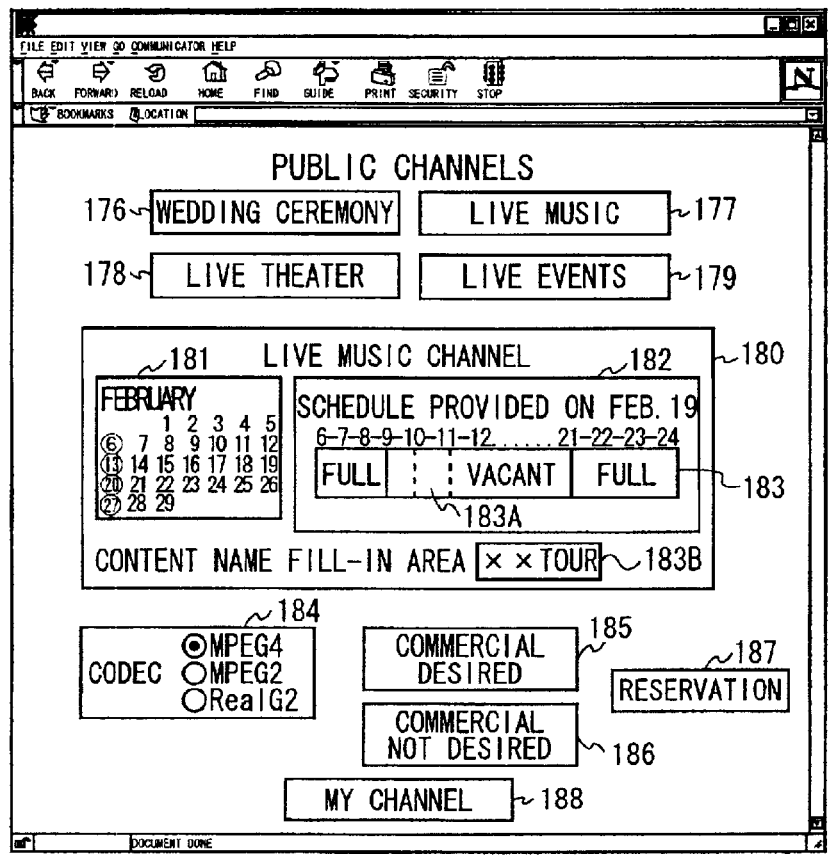
FIG. 31 is a schematic diagram showing a live type providing schedule management screen for public channels.
FIG. 32 is a schematic diagram showing the content of live type providing schedule control file.
Figure 33:
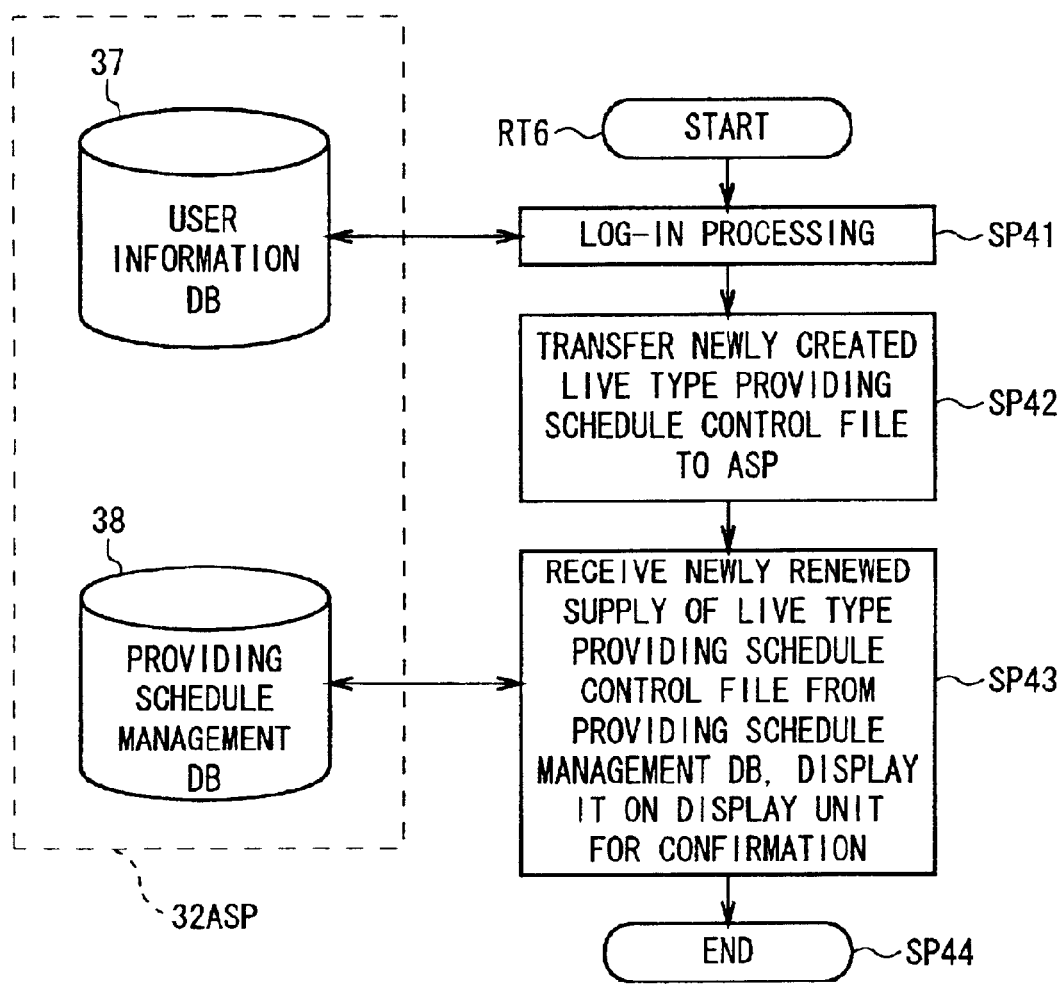
FIG. 33 is a flowchart showing a reservation processing sequence.

At the step SP33 the CPU 10 of the PC 2 lets the display unit 17 display a live type providing schedule management screen 175, as shown in FIG. 31, for a public channel based on the live type providing schedule control file on the reservation status of a public channel supplied from the ASP32, and then it terminates the processing at the next step SP34.

On this live type providing schedule management screen 175 are formed four (4) types of public channel buttons: wedding ceremony Ch button 176, music live Ch button 177, theater live Ch button 178, and live event Ch button 179, oriented to a wedding ceremony channel, music live channel, theater live channel, and event live channel respectively.

When the music live Ch button 177 is clicked for example by a content creator out of the four types of public channels, the CPU 10 of the PC 2 displays in a schedule content display area 180 the current reservation status of the "MUSIC LIVE CHANNEL" based on the live type providing schedule control file.

On a schedule time plan table 182 in the schedule content display area 180 is displayed the reservation status on the date of the current day as a default, and when a desired reservation data (e.g., February 19) in the calendar display area 181 is clicked by the content creator, the CPU 10 of the PC 2 displays a reservation status of a desired reservation date (February 19) regarding the music live channel in the schedule time plan table 182 based on the live type providing schedule control file.

The content creator is to confirm the reservation status on a desired reservation date (February 19) displayed on the schedule time plan table 182 and to appoint a desired start time (e.g., 10:00) and end time (10:59:59) out of the "vacant" time schedule of a time schedule appoint bar 183 with the cursor, whereby determining a time schedule frame 183A for a content of a live video to be provided.

By performing the above processing, the CPU 10 of the PC 2 acknowledges as the reserved time schedule frame data the start time and end time of the time schedule frame 183A specified by the content creator, which is additionally written in the live type providing schedule control file, displaying "FULL" in the time schedule frame 183A.

If the content creator enters the name (e.g., "xx tour") of a content to be provided in the reserved time schedule frame 183A, that name is automatically added to the live type providing schedule control file oriented to a given content ID.

When a check mark is affixed to the MPEG 4 for example as a codec when providing a content of a live video out of the codec selection display area 184, the CPU 10 of the user PC 2 acknowledges the type of a selected codec as MPEG 4, the result of which is added to the live type providing schedule control file as the codec type data.

Out of a commercial desired button 185 by which a client PC 4 wants a commercial video provided, affixed to the head portion of content, and a commercial undesired button 186 by which the client PC 4 indicates that a commercial video is not desired to be provided, when the commercial desired button 185 is clicked by the content creator, the CPU 10 of the PC 2 creates commercial desired data by which a commercial video is desired to be affixed to the content of a live video, which is added to the live type providing schedule control file.

Thus, the CPU 10 of the PC 2 performs various settings to provide a content of a live video through a music live channel as a public channel, thereby creating a new live type providing schedule control file 189 as shown in FIG. 32, which is once recorded on the HDD 12.

In the live type providing schedule control file 189 are stored an ISP name (***) used when connecting to the Internet 5 as an "ISP connection destination", channel type (public channel) used as an "ASP channel" when the ASP provides a content of a live video, the title (xx tour) of a content as the "name of a content", codec (MPEG 4) as "CODEC" at the time of providing, type of a public channel (music live channel) selected by the content creator as a "public channel" matching a content of a live video, time and date (various conditions such as a providing schedule from 10:00, February 19), with/without commercial providing request (with commercial) as "commercial request", user ID (kimkim) as the "user ID" at the time of user registration, and a password (***) as the "password" at the time of user registration.

When the reservation button 187 on the live type providing schedule management screen 175 is clicked by the content creator, the CPU 10 of the PC 2 starts a routine RT6 at the start step, and move on to the step SP41 following the automatic upload software.

At the step SP41 the CPU 10 of the PC 2 logs in to the ASP 32 with the network interface 16 (FIG. 3) over the Internet 5 and through the ISP 31, and obtains authentication based on the user ID and password, etc., by accessing the user information database 37 of the ASP 32, and then it proceeds to the next step SP42.

At the step SP42, having obtained authentication of the ASP 32, the CPU 10 of the PC 2 transfers a newly created live type providing schedule control file 189 to the management server 36 of the ASP 32 over the Internet 5, and it proceeds to the next step SP43.

Thus, the management server 36 of the ASP 32 renews the providing schedule management database 38 with the use of the live type providing schedule control file 189 transferred from the user PC 2, and subsequently reads out the live type providing schedule control file 189 again from the providing schedule management database 38, which is sent back to the user PC 2.

At this time the management server 36 of the ASP 32 charges, oriented to the user ID, as a service use charge a reservation fee for performing reservation processing anew to have the content of a live video provided to the user PC 2, and renews the user information DB table 45 in the user information database 37.

At the step SP43 the CPU 10 of the PC 2 receives a supply of the renewed live type providing schedule control file 189 with the providing schedule management database 38 renewed, and lets the display unit 17 display the live type providing schedule management screen 175 again for confirmation based on the live type providing schedule control file 189, and it proceeds to the next step SP44, terminating the processing.

The live type providing schedule management screen 175 displayed at this time is with the time schedule frame 183A indicated, segmented in a specific color, with the letters "FULL" for confirmation on the part of the content creator, whereby the content creator can easily acknowledges the schedule of a content reserved by himself/herself.

In such a case, however, that a reservation can not be made due to the indication of "FULL" for a desired time schedule frame on the time schedule appoint bar 183 in the schedule time plan table 182, in which a content of a live video is to be provided as a result of confirming the reservation status indicated in the schedule content display area 180 on the live type providing schedule management screen 175 (FIG. 31) for a public channel, a content of a live video can not be provided through that public channel.

Figures 34, 35:
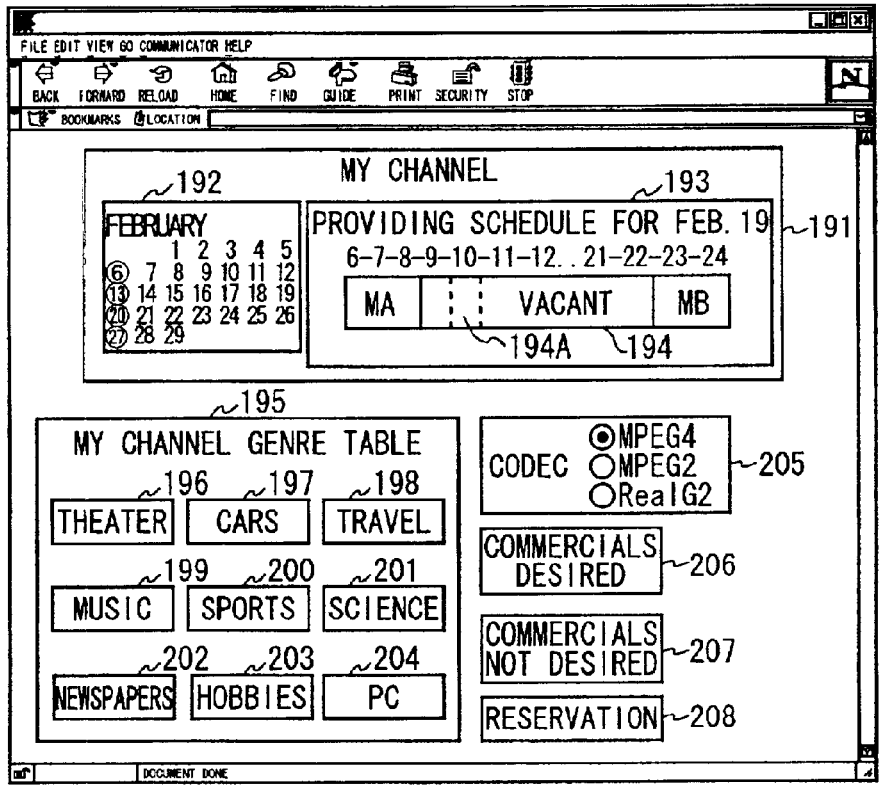
FIG. 34 is a schematic diagram showing a live type providing schedule management screen for my channel.
FIG. 35 is a schematic diagram showing the content of a live type providing schedule control file for my channel.

If the my channel button 188 is clicked by the content creator located at the lower part of the live type providing schedule management screen 175 at such a time, the CPU 10 of the PC 2 receives a supply of an on-demand type schedule control file 120 in the providing schedule management database 38 from the management server 36 of the ASP 32, and displays a live type providing schedule management screen 190 for my channel as shown in FIG. 34 appears based on the on-demand type providing schedule control file 120.

Comprising my channel schedule content display area 191, my channel genre table area 195, codec selection area 205, commercial desired button 206, commercial not desired button 207, and reservation button 208, the live type providing schedule management screen 190 for this my channel is designed to be capable of making a reservation for providing a content of a live video utilizing a "vacant" time schedule other than the reserved time schedule frames (time schedule frames indicated by MA and MB) on the time schedule appoint bar 194, in which a content is to be provided in the on-demand type.

In this case, too, when a desired reservation date (e.g., February 19) in the calendar display area 192 in the my channel schedule content display area 191 is clicked by the content creator, the CPU 10 of the PC 2 has the reservation status on a desired reservation date (February 19) for my channel displayed on the schedule time plan table 193 based on the on-demand type providing schedule control file 120.

Accordingly, the content creator can confirm the reservation status displayed on the schedule time plan table 193, and appoint a desired start time (e.g., 10:00) and end time (10:59:59) with the cursor out of the "vacant" time schedule on the time schedule appoint bar 194, determining a time schedule frame 194A in which to provide a content of a live video through my channel.

Due to the above, the CPU 10 of the PC 2 acknowledges as the reserved time schedule frame data: the start time and end time indicated in the time schedule frame 194A determined by the content creator, concurrently displaying the letters "FULL" in the time schedule frame 194A, with the reserved time schedule frame data once recorded on the HDD 12.

Next, when the clicking is made on the category (music) icon 199 oriented to the video genre of a live video out of the category icons 196 to 204 displayed in the my channel genre display area 195, the CPU 10 of the PC 2 acknowledges the category of the selected video genre as "music", the result of which is once recorded on the HDD 12 as the category data.

At this time the CPU 10 of the PC 2 indicates the letters "music" in the time schedule frame 194A on the time schedule appoint bar 194, replacing the letters "FULL".

Subsequently, when a check mark is put on the MPEG4 for example as a codec in providing a client PC 4 with a content of a live video out of the codec selection display area 205, the CPU 10 of the PC 2 acknowledges the selected codec type as MPEG4, result of which is once recorded on the HDD 12 as the codec type data.

Out of a commercial desired button 206 by which a client PC 4 wants a commercial video provided, affixed to the head portion of a content, and a commercial undesired button 207 by which a client PC 4 indicates that a commercial video is not desired to be provided, when the commercial desired button 206 is clicked by the content creator, the CPU 10 of the PC 2 also creates commercial desired data by which a commercial video is desired to be affixed to a content of a live video, which is once recorded on the HDD 12.

Thus, with various settings made to provide a live video of music live as a content in my channel as described above, when the reservation button 208 is clicked by the content creator, the CPU 10 of the PC 2 creates a new live type providing schedule control file 210 for my channel as shown in FIG. 35, which is transferred to the management server 36 of the ASP 32 over the Internet 5 to be recorded in the providing schedule management database 38.

When a plurality of content creators make a reservation for providing a content of a live video through my channel, the management server 36 of the ASP 32 puts a limitation on the number (e.g., up to 10 pieces) of contents of a live video allowed to be provided in the same time schedule frame.

Accordingly, when the management server 36 of the ASP 32 detects that the number allowed to provide in a given time schedule frame desired by a content creator has reached the upper limit based on a providing schedule program invoked from the internal hard disk, it does not accept a live type providing schedule control file 210 for my channel to be sent from the user PC 2 thereafter, and retrieves image data on a reservation unable message display screen stored in advance in the providing schedule management database 38, which is transmitted to a user PC 2 over the Internet 5.

Figures 36, 37:
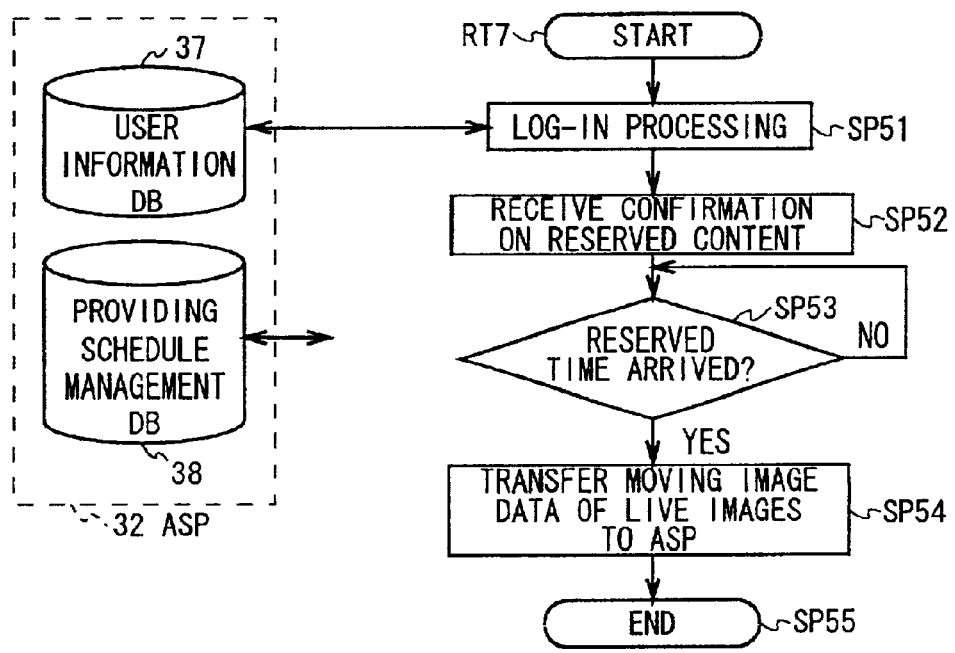
FIG. 36 is a schematic diagram showing a reservation unable message display screen.
FIG. 37 is a flowchart showing a connection processing sequence to an ASP in the live type.

The CPU 10 of the PC 2 lets the display unit 17 display a reservation unable message display screen 212 as shown in FIG. 36 based on the image data of the reservation unable message display screen, thereby notifying the content creator of the fact that "the desired time schedule frame is already fully booked, in which to provide a content of a live video on the real time".

Because of this, the management server 36 of the ASP 32 can provide a content of a live video to a client PC 4 without fail on the real-time without a tie-up or delay in providing a content due to possible problems on processing performance and the bandwidth of a line because the upper limit of the number of contents allowed to be provided simultaneously can never be exceeded, thus preventing the quality of a content of a live video from being deteriorated.

As described hitherto, the CPU 10 of the PC 2 can selects a method out of two; to provide a content of a live video on the real time at a desired time on a desired date reserved, or to provide through a public channel, or through my channel when all the public channels are already booked.

Accordingly, the content creator of a user PC 2 is to select a method to provide through my channel when providing a live video on the real time over an amateur band he/she operates on, or it is possible to select a method to provide through a public channel when providing a live video of a famous professional artist.

Like this, the content providing service system 1 is designed such that either the on-demand type or live type may be selected as a content providing mode in consideration of a content or users watching and listening in to the content.

(6-2) Connection Processing to ASP in the Live Type

Having finished reservation processing on time and date on which to provide the content of a live video, the CPU 10 of the PC 2 next lets the display unit 17 indicate the live type personal casting control screen 170 (FIG. 29) again.

At this time the content creator recognizes the content of a reservation when providing the content of a live video by confirming the live type personal casting control screen 170, and starts recording on the photographing spot with a digital video camera 18 (FIG. 3) when the reserved start time approaches, with the connection button 82 clicked to provide the content of a live video on the real time.

Then, the CPU 10 of the PC 2 starts a routine RT7 shown in FIG. 37 following the automatic upload software at the start step, and proceeds to the step SP51.

At the step SP51 the CPU 10 of the PC 2 logs in to the ASP 32 with the network interface 16 over the Internet 5 and ISP 31, and accesses the user information database 37 in the ASP 32 to obtain authentication based on the user ID and password, etc., moving on to the next step SP52.

At the step SP52 the CPU 10 of the PC 2 lets the management server 36 of the ASP 32 confirm the content of a live type providing schedule control file 189 (FIG. 32) stored in the providing schedule management database 38 based on the user ID and password, and then it moves on to the next step SP53.

Thus, the management server 36 of the ASP 32 confirms the content of the live type providing schedule control file 189 in the providing schedule management database 38, so that the PC 2 can recognize the reservation status regarding a content of a live video to be provided.

At the step SP53 the CPU 10 of the PC 2 is given an instruction command to "Transmit content of live video" from the management server 36 of the ASP 32 when the reserved start time arrives, and judges whether the reserved start time has arrived based on that instruction command.

A negative result, if obtained at this point, means that the instruction command has not been given from the management server 36, and the CPU 10 stands by until an instruction command is given from the management server 36 of the ASP 32.

On the other hand, if an affirmative result is obtained at the step SP53, it means that the instruction command is given from the management server 36 of the ASP 32, and the CPU 10 judges that the start time has arrived, and it proceeds to the step SP54.

At the step SP54 the CPU 10 of the PC 2 starts a transferring process to transfer the content of a live video being recorded with the instruction command given from the management server 36 of the ASP 32 as the trigger to the management server 36 of the ASP 32 on the real time over the Internet 5, terminating the processing at the next step SP55.

Thus, the management server 36 of the ASP 32 records the content of the live video transferred from the user PC 2 in the exclusive memory area in the content server 39 assigned to the public channel, which stream-reproduced and provided to a client PC 4 requiring it on the real time.

At this time the control server 33 of the ISP 31 charges the Internet connection charges occurring while the user PC 2 is transferring the content of the live video to the ASP 32 over the Internet 5, oriented to the user ID of the user PC 2, and renews the charge data in the charge management database 34.

Meanwhile, the management server 36 of the ASP 32 charges the service use charge of the ASP 32, oriented to the user ID of he user PC 2, of which charge data is transmitted to the charge management database 34 via the network interface 41 and the network interface 35 of the ISP 31, renewing the charge data of the charge management database 34.

In the case that the user PC 2 has a fixed or flat rate service contract called "as-much-as-I-like course, the management server 36 of the ASP 32 records only the connection period from connection start time and date to connection end time and date on the user information DB table 45 in the user information database 37, and no service use charge is charged, remaining fixed.

(6-3) Providing Processing of Content in the Live Type

Similarly to the case of receiving a supply of a content in the on-demand type, user registration is possible in the case where a client PC 4 receives a supply of a content of a live video in the live type, and in this case, the user registration procedure is to be made following the user registration procedure processing protocol of the routine RT1 (FIG. 8), wherein the management server 36 of the ASP 32 carries out the registration of a viewer information file into the viewer information database 40, oriented to the user ID and password of the client PC 4.

When user registration is not made, a client PC 4 may directly access, as a visitor, the Web site of the personal casting service provided by the ASP 32. The only those clients PC 4 who made user registration are allowed to make a contribution easily to the content creator of a content, by or with which they are moved or sympathize, or if they feel the content is excellent.

Figure 38:
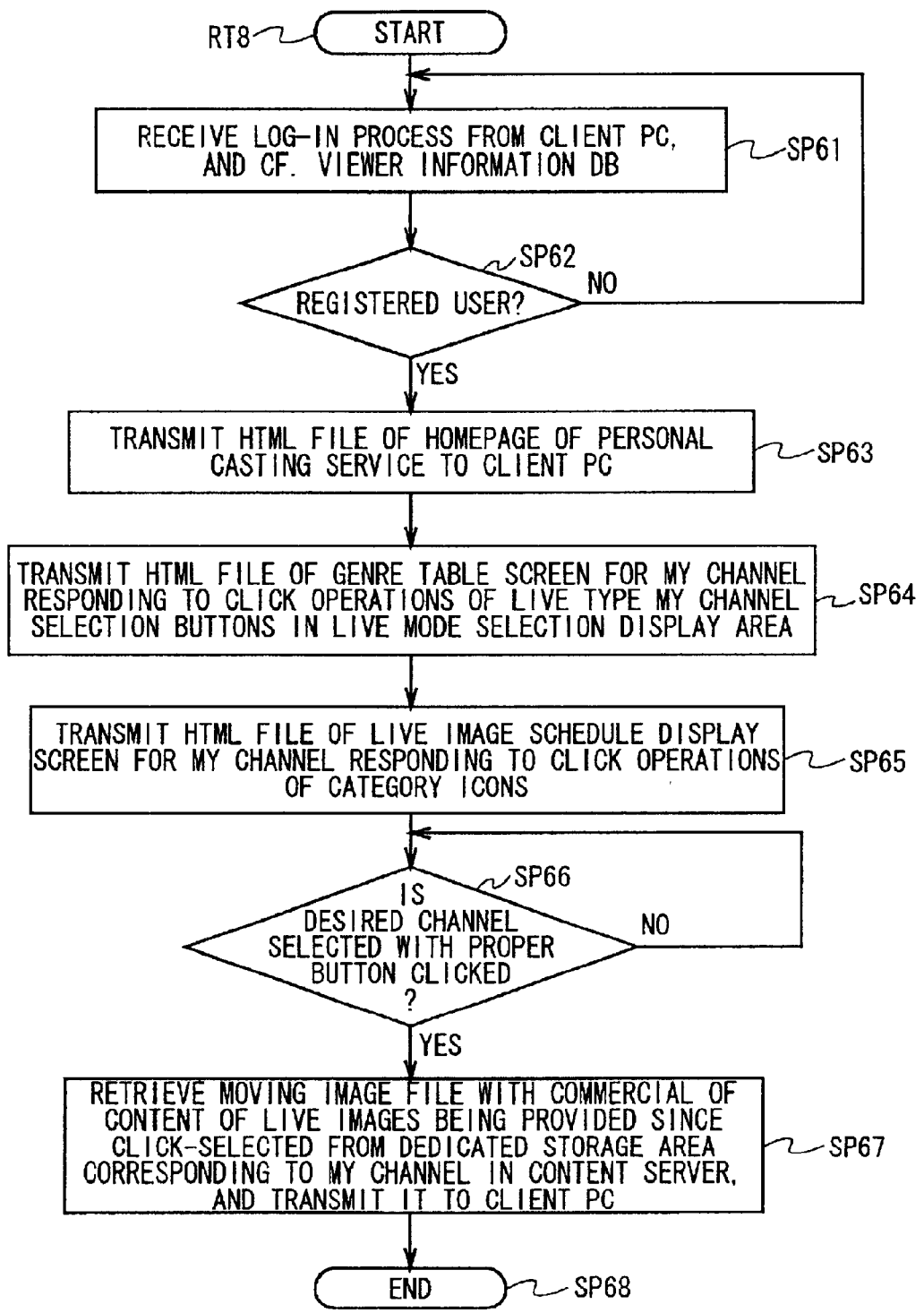
FIG. 38 is a flowchart showing a casting processing sequence conducted through my channel in the live type.

In practice, when a content of a live video is provided to a client PC 4 having conducted user registration through my channel in the live type for example, the management server 36 of the ASP 32 starts a routine RT8 shown in FIG. 38 at the start step, following a content providing program invoked from the internal hard disk, and moves on to the step SP61.

At the step SP61 the management server 36 of the ASP 32 is logged in by the client PC 4, and moves to the next step SP62, referring to the viewer information file in the viewer information database 40 based on the user ID and password transmitted from the client PC 4.

At the step SP62 the management server 36 of the ASP 32 judges whether the client PC 4 logging in is a registered regular user as a result of having referred to the viewer information file in the viewer information database 40 based on the user ID and password.

A negative result here, if obtained, indicates that the user ID and password do not match those registered in the viewer information database 40, and then the management server 36 of the ASP 32 returns to the step SP61, prompting the client PC4 to enter the correct user ID and password to perform the log-in processing again.

If an affirmative result is obtained at the step SP62, it means that the client PC 4 is a registered regular user, and the management server 36 of the ASP 32 proceeds to the next step SP63.

At the step SP63 the management server 36 of the ASP 32 reads out the HTML file of the homepage of the personal casting service from the content server 39 responding to the access by the client PC 4, which is transferred to the client PC 4 from the network interface 41 over the Internet 5.

At this stage the client PC 4 receives at its CPU the HTML file of the homepage of the personal casting service transmitted from the ASP 32, which is displayed on the display unit as a homepage screen 125 (FIG. 25).

When the live type my channel selection button 130 in the live mode selection display area 128 is clicked by the user on this homepage screen 125, the CPU of the client PC 4 transmits a mode selection signal indicating the selection of the live type my channel selection button 130 to the management server 36 of the ASP 32 over the Internet 5.

At the step SP64 the management server 36 of the ASP 32 reads out the HTML file forming a genre display screen for my channel from the content server 39 based on the mode selection signal transmitted from the client PC 4, which is transmitted from its network interface 41 to the client PC 4 over the Internet 5.

Thus, the CPU of the client PC 4 receives the HTML file of the genre display screen for my channel transmitted from the ASP 32, which is shown on the display unit as a genre display screen 135 (FIG. 26) for my channel.

When any one (e.g., the "music" category icon 139) of the category icons 136 to 144 is clicked by the user of a client PC 4 on this genre display screen 135 for my channel, the CPU of the client PC 4 transmits a genre selection signal matching the "music" category icon 139 to the management server 36 of the ASP 32 over the Internet 5.

At the step SP65 the management server 36 of the ASP 32 retrieves the HTML file forming the live video schedule display screen regarding the video category "music" from the content server 39 based on the genre selection signal transferred form the client PC 4, which is transmitted from its network interface 41 to the client PC 4 over the Internet 5.

Figure 39:
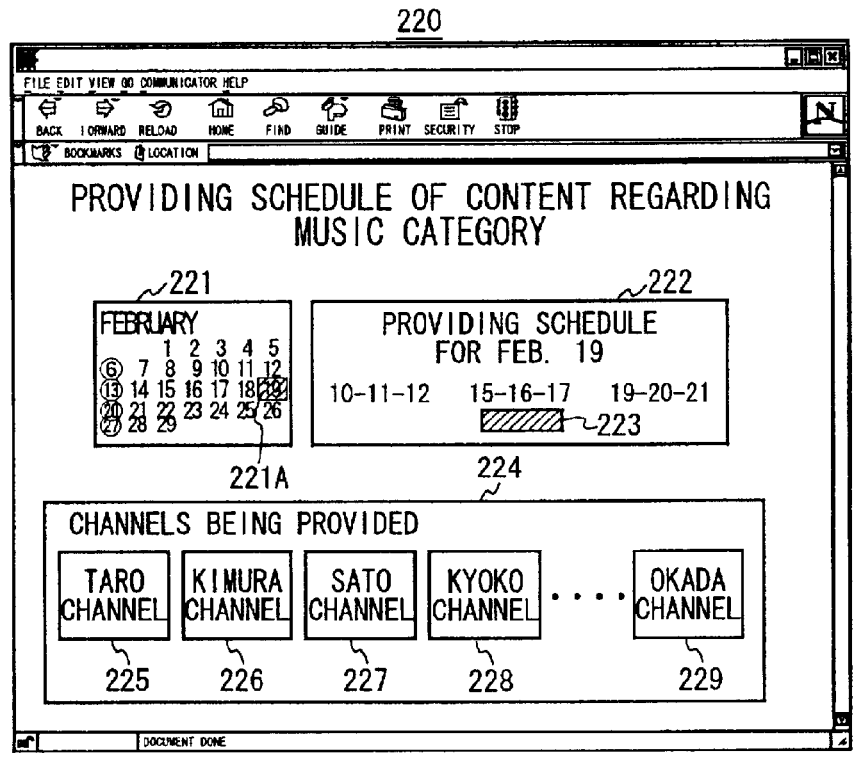
FIG. 39 is a schematic diagram showing a live video schedule display screen for my channel.

Thus, the CPU of the client PC 4 receives the HTML file forming the live video schedule display screen transferred from the ASP 32, which is shown on the display unit as a live video schedule display screen 220 for my channel as shown in FIG. 39.

On the live video schedule display screen 220 for my channel are formed a calendar display area 221 indicating dates, schedule content display area 222 indicating a providing schedule on which to provide the content of a live video through my channel, and channel type display area 224 indicating the channel name currently being provided in my channel.

The current date (e.g., February 19) is displayed in a shaded frame 221A on the calendar display area 221, so that the user of the client PC 4 can easily acknowledge the current date.

On the schedule content display area 222 is indicated a time schedule frame (a period from 15:00 to 16:59:59) of the content of live video the ASP 32 can provide at the current time (e.g., 15:10), which indicates that a content of each live video can be provided at the current time through my channel matching plural types (up to 10 Ch) of channel buttons 225 to 229 displayed in the channel type display area 224.

At the step SP66 the management server 36 of the ASP 32 judges whether a desired channel button ("Kimura" channel) 226 for example is selected by the user of the client PC 4 watching the live video schedule display screen 220 for my channel.

In this case, the CPU of the client PC 4 acknowledges a URL set up oriented to the selected channel button 226, and a channel selection signal indicating that the URL is transmitted to the management server 36 of the ASP 32 over the Internet 5, by which the management server 36 of the ASP 32 acknowledges that the desired channel button 226 is clicked when the channel selection signal is received.

A negative result at this step SP66, if obtained, indicates that none of the channel buttons 225 to 229 displayed in the channel type display area 224 on the live video schedule display screen 220 is selected, and then the management server 36 of the ASP 32 stands by until any one of the channel buttons 225 to 229 is selected.

If an affirmative result is obtained at the step SP66, however, it means that a user-desired channel button 226 is click-selected out of the channel buttons 225 to 229, and then the management server 36 of the ASP 32 proceeds to the next step SP67.

At the step SP67 the management server 36 of the ASP 32 stream-reproduces movie data with commercial of a live video to be provided at the time of clicking out of the exclusive memory area (oriented to the "Kimura" channel) in the content server 39, which is transmitted to the client PC 4 over the Internet 5, and it proceeds to the next step SP68, terminating the processing.

Figure 40:
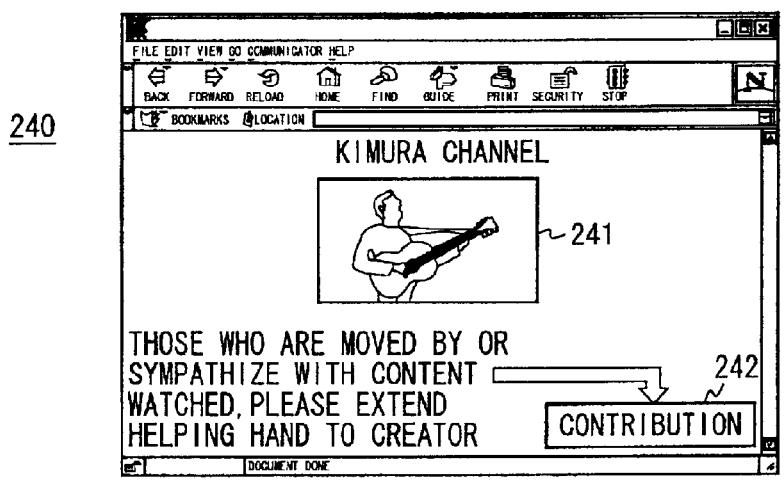
FIG. 40 is a schematic diagram showing a content display screen showing the content of a live video matching a selected channel button.

Thus, the CPU of the client PC 4 lets the display unit show the content display screen 240 of the live video as shown in FIG. 40 based on the movie data with commercial of the content transferred from the ASP 32, first displaying the commercial video in a movie display area 241 located in the center of the content display screen 240 followed by a movie showing the state of the music live.

The content of a live video being transmitted to the client PC 4, the management server 36 of the ASP 32 can not provide the content from the beginning as done in the on-demand type, so that the content of the live video is provided from midway, reproduced in streaming at the moment of the clicking.

Even in this case, however, when the commercial providing request is set to "with commercial" by the content creator of the user PC 2, the management server 36 of the ASP 32 transmits the commercial video to the client PC 4 without fail before providing the content of the live video.

Accordingly, the client PC 4 can not watch and listen in to the content of the live video immediately from the moment when the user-desired channel button 226 is clicked, but the content of the live video can be watched and listened in to only after the commercial video is first watched and listen in to.

In this way, even when providing a content of a live video to a client PC 4, the management server 36 of the ASP 32 is designed to force the user of the client PC 4 to watch and listen in to the commercial video regardless of the user's will.

At this time the control server 33 of the ISP 31 charges the Internet connection charge occurring while the user PC 2 is transmitting the movie data of a content of a live video to the ASP 32 over the Internet 5, oriented to the user ID of the user PC 2, resulting in the renewal of the charge data in the charge management database 34.

At the same time the management server 36 of the ASP charges the service use charge occurring while the movie data of the content of the live video being supplied from the user PC 2 over the Internet 5, is reproduced in streaming through the content server 39, oriented to the user ID of the user PC 2, of which data is registered on the user information DB table 45 in the user information database 37, and which is simultaneously recorded in the charge management database 34 through the network interface 41 and the network interface 35 of the ISP 31.

In the case that the user PC 2 has a fixed or flat rate service contract called "as-much-as-I-like course, the management server 36 of the ASP 32 records only the connection period from connection start time and date to connection end time and date on the user information DB table 45 in the user information database 37, and no service use charge is charged, remaining fixed.

Figure 41:
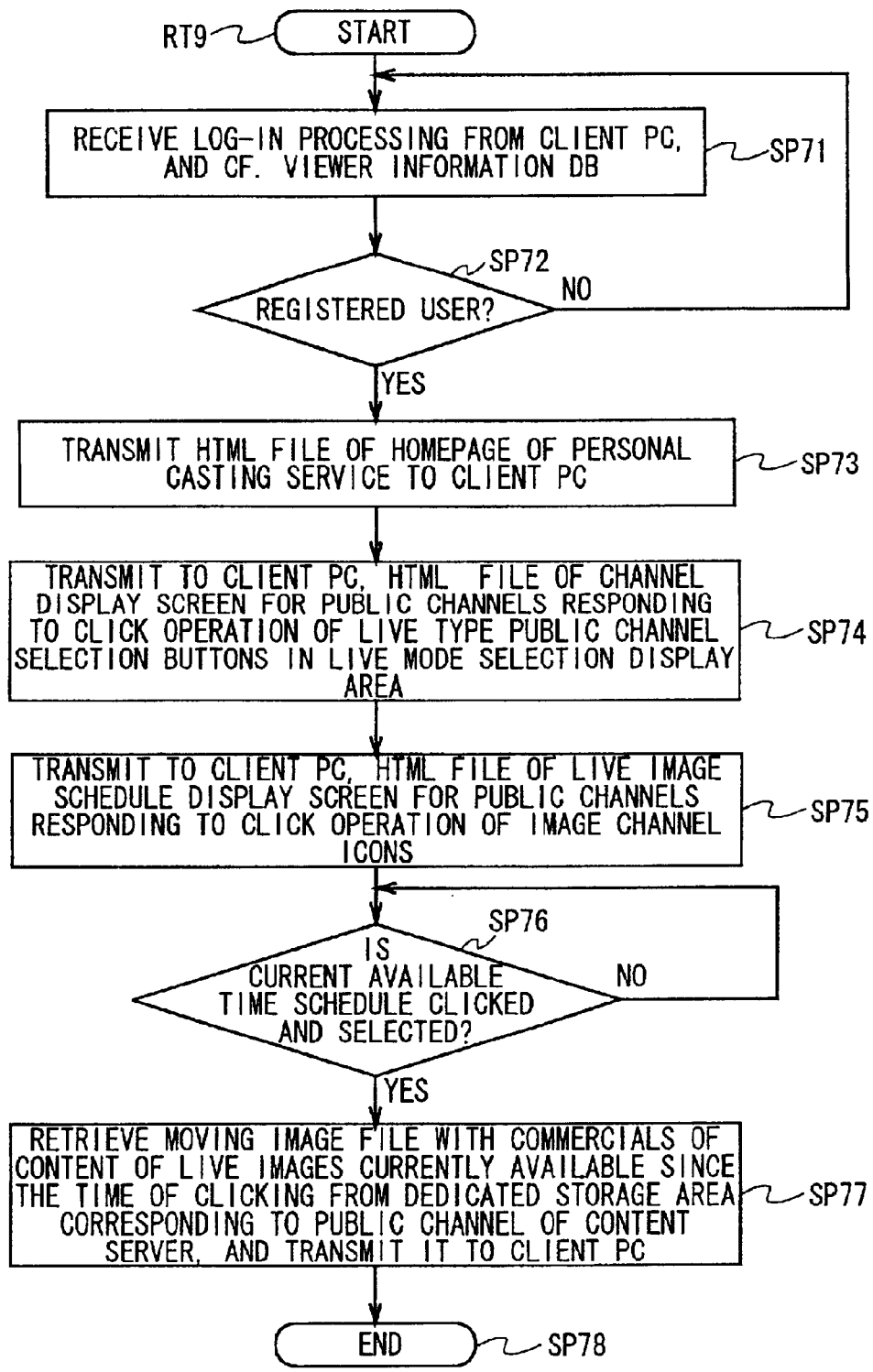
FIG. 41 is a flowchart showing a casting processing sequence conducted through a public channel in the live type.

On the other hand, when a content of a live video is provided to a user-registered client PC 4 through a public channel for example, the management server 36 of the ASP 32 enters into a routine RT9 shown in FIG. 41 at the start step, proceeding to the step SP71, following a content providing program invoked from the internal hard disk.

The steps SP71 to SP73 being similar to the steps SP61 to SP63 of the routine RT8 where a content of a live video is provided through my channel, the management server 36 of the ASP 32 transfers the HTML file of the homepage of the personal casting service to a client PC 4 through the network interface 41 over the Internet 5.

Thus, the client PC 4 receives the HTML file of the personal casting service transmitted from the ASP 32, which is displayed on the display unit 17 as the homepage screen 125 (FIG. 25).

When the live type public channel selection button 129 in the live mode selection display area 128 is clicked by the user on this homepage screen 125, the CPU of the client PC 4 transmits a mode selection signal indicating the selection of the live type public channel selection button 129 to the management server 36 of the ASP 32 over the Internet 5.

At the step SP74 the management server 36 of the ASP 32 reads out the HTML forming the channel display screen for public channels from the content server 39 responding to the mode selection signal transmitted from the client PC 4, which is transmitted to the client PC 4 from its network interface 41 over the Internet 5.

Figure 42:
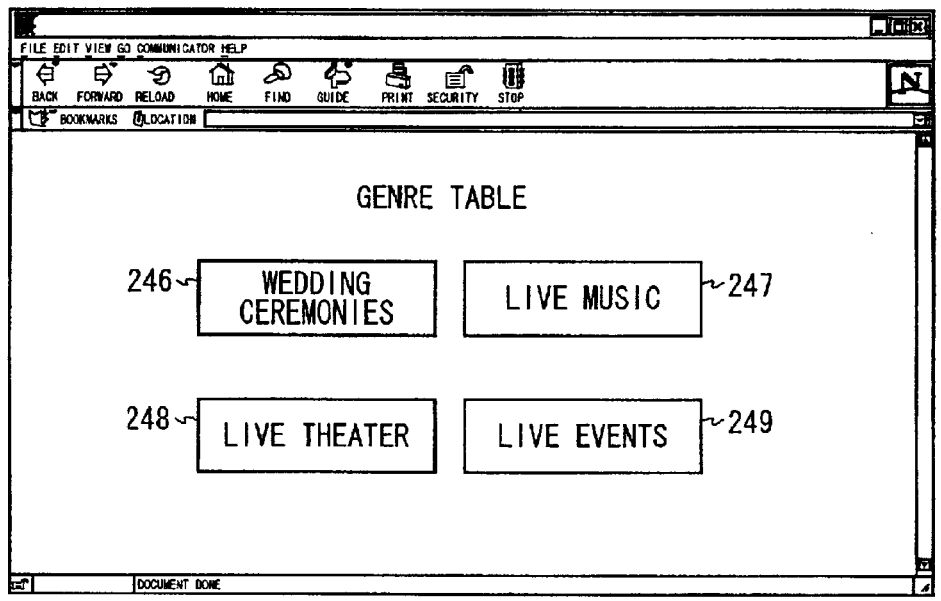
FIG. 42 is a schematic diagram showing a channel display screen for public channels.

Thus, the CPU of the client PC 4 receives the HTML file of the channel display screen for the public channel transferred from the ASP 32, which is displayed on the display unit as a channel display screen 245 for the public channels as shown in FIG. 42.

When any one (e.g., the "music live" channel icon 247) out of video channel icons 246 to 249 is clicked by the user of the client PC 4 on this channel display screen for the public channels 245, the CPU of the client PC 4 transmits a channel selection signal matching the "music live" channel icon 2347 to the management server 36 of the ASP 32 over the Internet 5.

At the step SP75 the management server 36 of the ASP 32 retrieves the HTML file forming the live video schedule display screen for the public channels regarding the "music live" channel from the content server 39 based on the channel selection signal transferred form the client PC 4, which is transmitted from its network interface 41 to the client PC 4 over the Internet 5.

Figure 43:
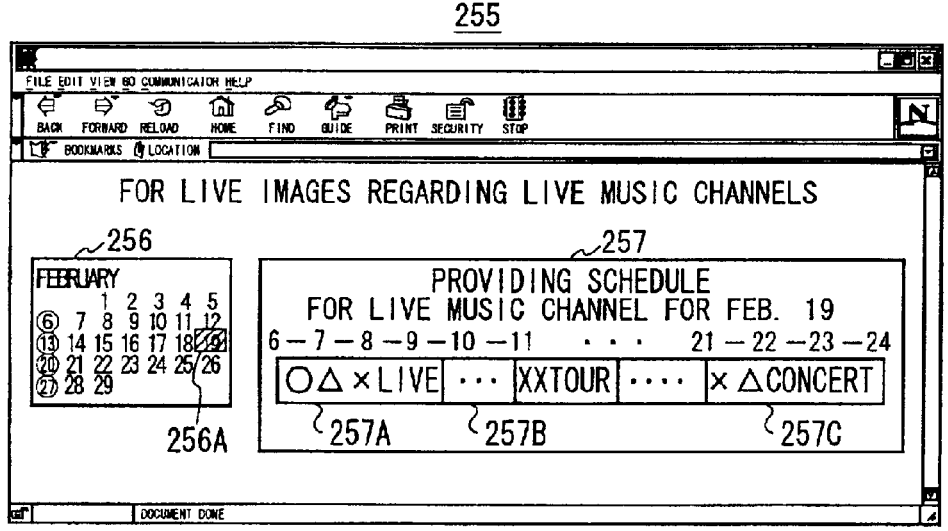
FIG. 43 is a schematic diagram showing a live video schedule display screen for public channels.

Thus, the PC 4 receives the HTML file forming the live video schedule display screen for the public channels transferred from the ASP 32, which is shown on the display unit as the live video schedule display screen 255 for public channels (255) as shown in FIG. 43.

On the live video schedule display screen for the public channels 255 are formed a calendar display area 256 indicating dates, and schedule content display area 257 indicating a providing schedule on which to provide a content of a live video regarding the selected "music live" channel.

The current date (e.g., February 19) is displayed in a shaded frame 256A on the calendar display area 256, so that the user of the client PC 4 can easily acknowledge the current date.

On the schedule content display area 257 is indicated the title of a content of a live video to be provided by the ASP 32 on February 19. In this case, it means a content of "○Δ live" is to be provided in a first time schedule frame 257A from 6:00 to 8:59:59, content of "xx tour" in a second time schedule frame 257B from 10:00 to 10:59:59, and a content of "×Δ concert" in a third time schedule frame from 21:00 to 23:59:59.

On the live video schedule display screen 255 for the public channels appears the second time schedule frame 257B matching the current time in a different color from those for the first time schedule frame 257A and the third time schedule frame 257C in the schedule content display area 257 at the current time (e.g., 10:09), whereby letting the user of a client PC 4 easily recognize that the content of "xx tour" can be watched and listened in to on real time as at the current moment.

At the step SP76 the management server 36 of the ASP 32 judges whether the second time schedule frame 257B available at the current time (e.g., 10:09) is click-selected by the user of the client PC 4 watching the live video schedule display screen 255 for the public channels.

In this case, the CPU of the client PC 4 recognizes a URL set up to the "music live" channel of the public channels when the second time schedule frame 257B selected, and a channel selection signal indicating the URL is transmitted to the management server 36 of the ASP 32 over the Internet 5, by which the management server 36 of the ASP 32 acknowledges that the second time schedule frame 257B is selected when the channel selection signal is received.

A negative result at this step SP76, if obtained, indicates that the second time schedule frame 257B available at the current time out of the schedule content display area 257 is not selected, and then the management server 36 of the ASP 32 stands by until the second time schedule frame 257B is selected.

If an affirmative result is obtained at the step SP76, however, it means that the second time schedule frame 257B is selected out of the schedule content display area 257, and then the management server 36 of the ASP 32 proceeds to the next step SP77.

At the step SP77 the management server 36 of the ASP 32 reproduces in streaming the movie data ("xx tour") with commercial of a live video to be provided in the "music live" channel at the time of clicking out of the exclusive memory area, oriented to the "music live" channel, in the content server 39, which is transmitted to the client PC 4 over the Internet 5, and it proceeds to the next step SP78, terminating the processing.

Figures 44, 45:
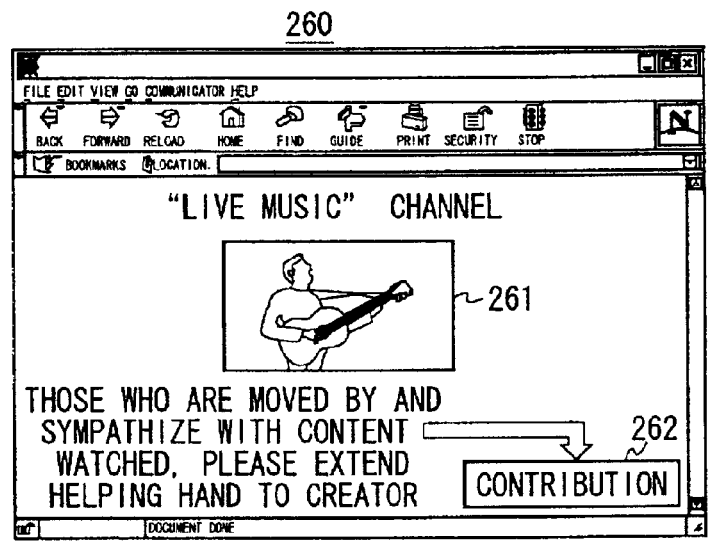
FIG. 44 is a schematic diagram showing a content display screen indicating the content of a live video selected at the music live channel.
FIG. 45 is a schematic diagram showing a contribution amount selection screen.

Thus, the CPU of the client PC 4 lets the display unit show a content display screen 260 of the live video as shown in FIG. 44 based on the movie data with commercial ("xx tour") of the live video transferred from the ASP 32, and the live video ("xx tour") matching the second time schedule frame 257B selected through the "music live" channel in the movie display area 261 located in the center of the content display screen 260.

In this case, too, a content of a live video is to be provided, reproduced in streaming, from the moment of the second time schedule frame 257B clicked, and when the commercial providing request of a content is set to "with commercial", the commercial video is first provided to the client PC 4 from the moment of the clicking, following by the content of a live video.

Thus, the management server 36 of the ASP 32 is to force the user of the client PC 4 to watch and listen in to the commercial video regardless of his/her will even when providing a content of a live video to the client PC 4 through a public channel.

At this time the control server 33 of the ISP 31 charges the Internet connection charge occurring while the user PC 2 is transmitting the movie data of a content of a live video to the ASP 32 over the Internet 5, oriented to the user ID of the user PC 2, resulting in the renewal of the charge data in the charge management database 34.

At the same time the management server 36 of the ASP the service use charge occurring while the movie data of a content of a live video being supplied from the user PC 2 over the Internet 5, is reproduced in streaming through the content server 39, oriented to the user ID of the user PC 2, of which data is registered on the user information DB table 45 in the user information database 37, and which is simultaneously recorded in the charge management database 34 through the network interface 41 and the network interface 35 of the ISP 31.

However, in the case that a user PC 2 has a fixed or flat rate service contract called "as-much-as-I-like course, the management server 36 of the ASP 32 records only the connection period from connection start time and date to connection end time and date on the user information DB table 45 in the user information database 37, and no service use charge is charged, remaining fixed.

(7) Contribution Processing by Client PC

The user of a client PC 4 is allowed to make a contribution easily to a content creator if he/she is moved by or sympathizes with content provided, or if he/she feels that a content is excellent.

When a user watching and listening in to a content clicks a contribution button 167, 242, or 262 placed respectively on the content display screen 165 (FIG. 28) of the on-demand type displayed on the display unit based on a movie file with commercial of a content downloaded from the ASP32, or on the content display screen 240 (FIG. 40) and content display screen 260 (FIG. 44 of the live type displayed on the display unit based on a movie with commercial of a content of a live video, the CPU of a client PC 4 has a contribution amount selection screen 270 as shown in FIG. 45 displayed next to the contribution buttons 167, 242, and 262 following a contribution program invoked from the internal hard disk (not shown in figure).

On this contribution amount selection screen 270 are formed contribution selection buttons 271 to 276 corresponding to the various amounts of contributions, and the user of a client PC 4 can click-select any contribution selection button out of the same contribution amount buttons 271 to 276 freely corresponding to an amount he/she wishes to contribute.

Accordingly, when the user clicks the contribution selection button 272 to make a contribution of ¥1,000 for example, the CPU of the client PC 4 creates contribution data of the amount corresponding to the selected contribution selection button 272, which is transmitted to the management server 36 of the ASP 32 over the Internet 5.

The management server 36 of the ASP 32 converts the contribution data transmitted from the client PC 4 into points on the basis of a given conversion rate, and retrieves a user information DB table 45 matching the content ID from the user information database 37, renewing the accumulated number of points on the user information DB table 45 with the points based on the contribution data.

The CPU of the client PC 4 creates charge data matching the contribution data, which is transmitted to the management server 36 of the ASP 32 over the Internet 5. Thus, the management server 36 of the ASP 32 records the charge data for the contribution amount in a viewer information file in the viewer information database 40, along with the service use charge for the ASP32 the client PC 4 used.

At the same time the ISP 31, too, charges the Internet connection charge occurring while the client PC 4 is receiving a supply of a content from the ASP 31 over the Internet 5, of which amount data is recorded in the viewer information file in the viewer information database 40 as well as in the amount management database 34.

Meantime, when a visitor other than registered users makes a contribution to the content creator, the click of the contribution buttons 167, 242, or 262 by the visitor lets the CPU of the client PC 4 display a contribution amount selection screen 270 (FIG. 45) as well as an input screen (not shown in figure) for a credit card number and other information, with which the visitor makes a contribution, promoting the visitor to enter a credit card number.

Consequently, the CPU of the client PC 4 transmits the credit card number data and the contribution data of an amount corresponding to a contribution selection button to the management server 36 of the ASP 32 over the Internet 5, which renews the number of accumulated points on the user information DB table 45 with the points corresponding to the contribution data.

The management server 36 of the ASP 32 transmits the contribution data of the amount the visitor contributes to the charge management database of a credit card company based on the credit card number data, requesting the credit card company to perform charge processing on the contribution by the visitor.

(8) Monthly Point Settlement Processing

Figure 46:
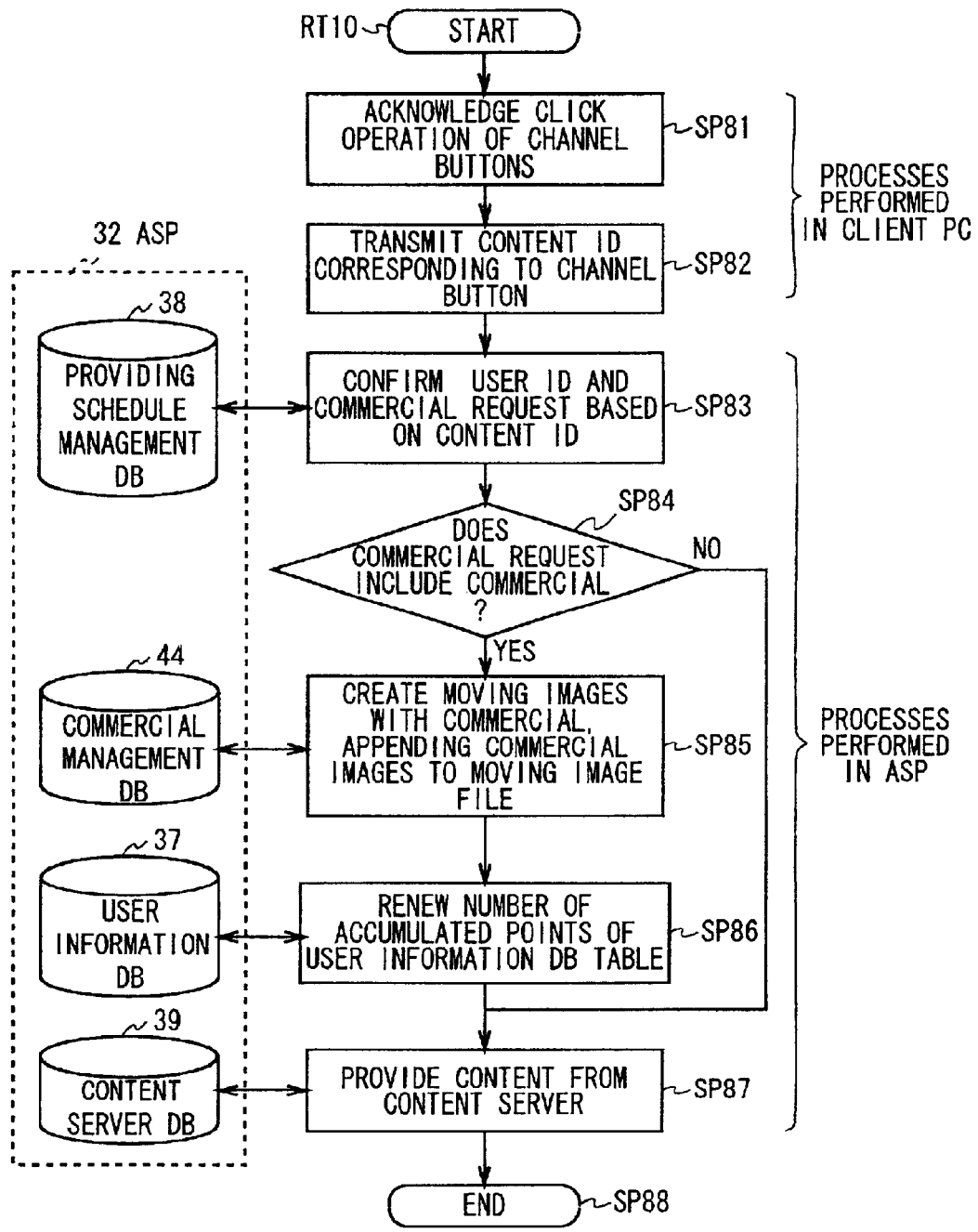
FIG. 46 is a flowchart showing the providing processing sequence of content with commercial video.

Lastly, explanation is given on the monthly points settlement processing by which a profits give-back is made to a content creator, proportionate to the number of accumulated points on the user information DB table 45 calculated by the month, but before that, recapping the providing process procedure for content with commercial video to be provided to a client PC 4, a routine RT10 shown in FIG. 46 is started at the start step, and it moves on to the SP81.

At the step SP81 the CPU of a client PC 4 acknowledges that a desired channel button 155 is clicked by a user out of the channel display screen 150 (FIG. 27), and then it proceeds to the next step SP82.

At the step SP82 the CPU of the client PC 4 transmits a content ID matching the selected channel button 155 to the management server 36 of the ASP 32 over the Internet 5, and it proceeds to the next step SP83.

At the step SP83 the management server 36 of the ASP 32 turns on a content providing program invoked from the internal hard disk, and retrieves the on-demand type schedule control file 120 out of the providing schedule management database 38 based on the content ID transmitted from the client PC 4 for example, and after confirming the user ID and the content of a commercial request, it moves on the next step SP84.

At the step SP84, after confirming the on-demand type providing schedule control file 120, the management server 36 of the ASP 32 judges whether the commercial request is set to "with commercial".

A negative results, if obtained, means that a commercial video is not appended to a content "without commercial" to be provided to the client PC 4, and then the management server 36 of the ASP 32 proceeds to the step SP87 to provide the movie file of the content not appended with a commercial video, terminating the processing at the next step SP88.

Whereas, if an affirmative result is obtained at the step SP84, it means that the commercial request is set to "with commercial" with a commercial video affixed to a content to be provided to a client PC 4, and then the management server 36 of the ASP 32 proceeds to the next step SP85.

At the step SP85 the management server 36 of the ASP 32 creates a content of a movie file with commercial by appending a commercial video stored in the commercial management database 44 to the head portion of a movie file stored in the content server 39, which is once stored in the content server 39, and then it moves on to the next step SP86.

At the step SP86 the management server 36 of the ASP 32 renews the number of accumulated points on the user information DB table file 45 in the user information database 37 with the points occurred when a content of the movie file with commercial is provided to the client PC 4, and it proceeds to the next step SP87.

At the step SP87 the management server 36 of the ASP 32 reads out a content of a movie file with commercial from the content server 39 when the commercial request is "with commercial", which is provided to the client PC 4 over the Internet 5, and it proceeds to the next step SP88 terminating the processing.

Like this, in the content providing system 1, when the management server 36 of the ASP 32 reads out a content of a movie file with commercial from the content server 39 with the commercial request set to "with commercial" and provides it to the client PC 4, points are generated, with the number of accumulated points on the user information DB table 45 renewed consequently.

Figure 47:
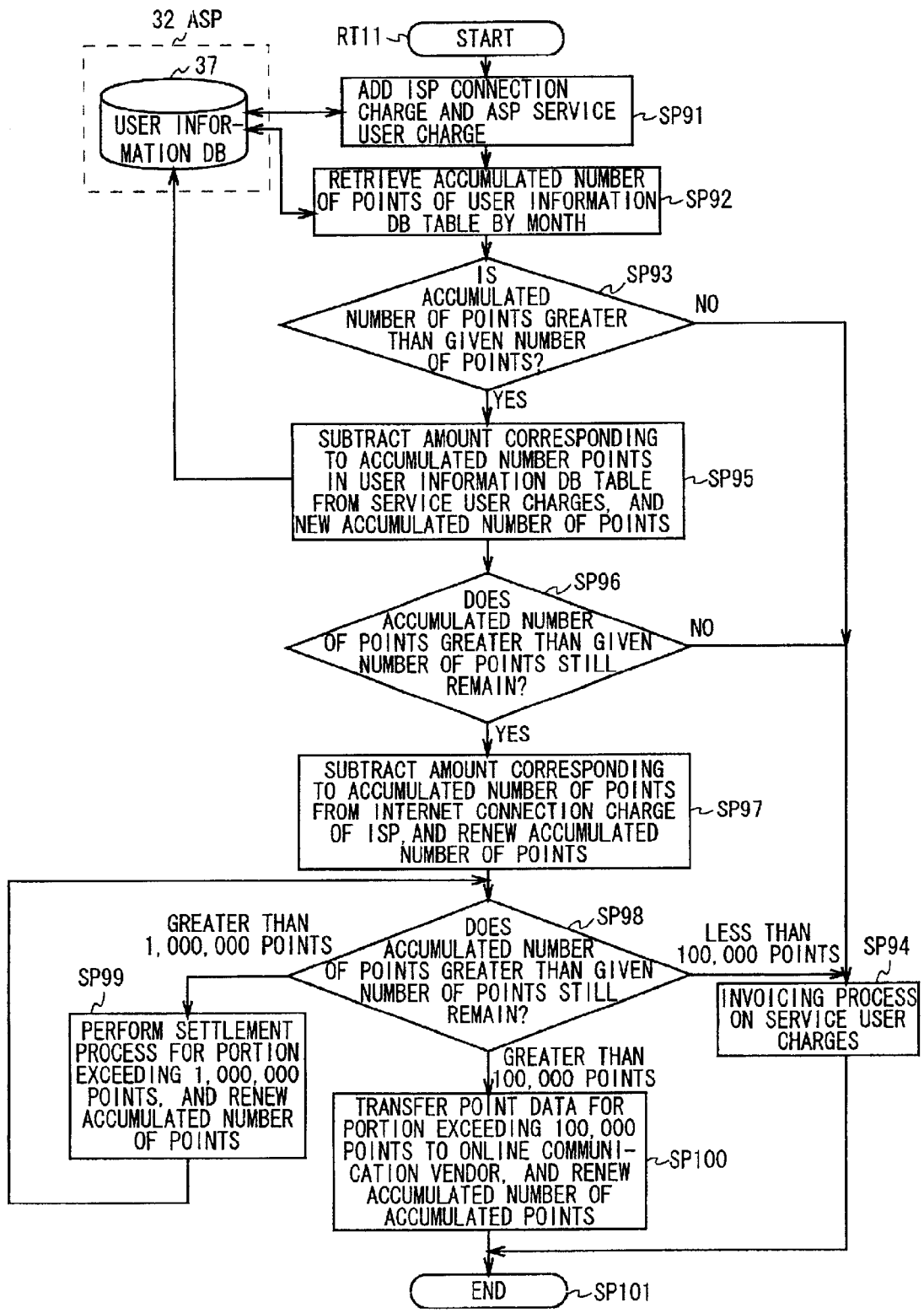
FIG. 47 is a flowchart showing a profits give-back processing sequence.

Next, in the content providing system 1, recapitulation is made on the monthly points settlement processing procedure followed when performing profits give-back processing for a content creator, matching the number of accumulated points on the user information DB table 45 calculated by the month. A routine RT11 shown in FIG. 47 is started at the start step, and it proceeds to the step SP91.

At the step SP91 the management server 36 of the ASP 32 renews the user information DB table 45 by adding to it the Internet connection charge to the ISP31 and the service user charge of the ASP32 by the user PC 2 (when the "as-much-as-I-like course" is set up, the service use charge remains fixed), and it proceeds to the next step SP92.

At the step SP92 the management server 36 of the ASP 32 reads out the monthly number of accumulated points, referring to the user information DB table 45 stored in the user information database 37, and it proceeds to the next step SP93.

At the step SP93 the management server 36 of the ASP 32 judges whether the number of accumulated points left over is greater than a given number of points.

A negative result here, if obtained, means that the number of accumulated points left over is not greater than a given number of points, then the management server 36 of the ASP 32 moves on to the next step SP94.

At the step SP94, since the number of accumulated points left over is not greater than a given number of points, the management server 36 of the ASP 32 performs an invoicing process of the service use charge at the current time to a user PC 2 without conducting profits give-back processing matching the number of accumulated points, and it proceeds to the next step SP101 terminating the processing.

Whereas, if an affirmative result is obtained at the step SP93, it means that the monthly number of accumulated points left over is greater than a given number of points, and then the management server 36 of the ASP 32 proceeds to the next step SP95 to perform profits give-back processing proportionate to the number of accumulated points.

At the step SP95 the management server 36 of the ASP 32 subtracts the amount of the service use charge of the ASP 32 proportionate to the number of accumulated points on the user information DB table 45, and renews the user information AB table 45 by subtracting the number of points proportionate to the service use charge subtracted from the number of accumulated points on the user information DB table 45, and then it proceeds to the next step SP96.

Thus, the service use charge charged through a credit card company from the APS32 is subtracted or set off, so the content creator of a user PC 2 is to receive a profits give-back proportionate to the accumulated points.

At the step SP96 the management server 36 of the ASP 32 judges whether the number of accumulated points left over is greater than a given number of points after the service use charge of the ASP32 is given back.

A negative result here, if obtained, means that the number of accumulated points left over is smaller than a given number of points, then the management server 36 of the ASP 32 moves on to the next step SP94 to perform invoicing processing on the service use charge, terminating the processing at the next step SP101.

On the other hand, if an affirmative result is obtained at the step SP96, it indicates that the number of accumulated points left over is greater than a given number of points, then the management server 36 of the ASP 32 proceeds to the next step SP97.

At the step SP97 the management server 36 of the ASP 32 subtracts the amount of the Internet connection charge to the ISP 31 of a user PC 2 proportionate to the number of accumulated points, and renews the user information DB table 45 by subtracting the number of points proportionate to the Internet connection charge subtracted from the number of accumulated points on the user information DB table 45, and then it proceeds to the next step SP98.

Thus, the Internet connection charge demanded through the credit card company is subtracted or set off, so the a content creator of the user PC 2 is to receive a profits give-back proportionate to the accumulated points following the service use charge of the ASP 32.

At the step SP98 the management server 36 of the ASP 32 judges whether accumulated points are still left over at this moment, and if the accumulated points greater than one million are left over, the management server 36 of the ASP 32 moves on to the next step SP99.

At the step SP99 the management server 36 of the ASP 32 instructs the credit card company to subtract the number of accumulated points over one million from the settlement data through the credit card company, and then renews the number of accumulated points by subtracting the number of accumulated points over one million from the number of accumulated points on the user information DB table 45, then it goes back to the step SP98.

Whereas, if the number of accumulated points left over is smaller than one million points but greater than one hundred thousand at the step SP98, the management server 36 of the ASP 32 proceeds to the next step SP100.

At the step SP100 the management server 36 of the ASP 32 transfers point data on the portion of the number of accumulated points over one hundred thousand to an online communication sales company 6 over the Internet 5, and renews the number of accumulated points by subtracting the number of points over one hundred thousand points from the number of accumulated points on the user information DB table 45, terminating the processing at the next step SP101.

In this case, the online communication sales company 6 acknowledges personal information including the address and e-mail address of a content creator based on the contents of the user information SB table 45 transferred from the ASP 32 at the time of user registration, and delivers a given item (merchandise) proportionate to the number of points over one hundred thousand to the content creator of user PC 2, whereby performing profits give-back processing.

Furthermore, when the number of accumulated points left over is smaller than one hundred thousand at the step SP98, the management server 36 of the ASP 32 moves to the step SP94 to perform invoicing processing on the service use charge, terminating the processing at the next step SP101.

(9) Operation and Effect of the First Invention in the Present Mode of Embodiment Structured as described above, in the case of the on-demand type, the management server 36 of the ASP 32 secures the exclusive storage area for each content creator in the content server matching a URL assigned to each user PC 2 at the time of user registration, in which the movie file of a content supplied from the user PC 2 is stored.

Then, the management server 36 of the ASP 32 recognizes the time when a demand is made for a content from a client PC 4 over the Internet 5, and reads out the movie file with commercial of a content of a video type to be provided in the time schedule including that very time from the exclusive storage area in the content server 39, which is provided to the client PC 4 over the Internet 5.

In this way, the management server 36 of the ASP 32 provides the client PC 4 with the only type of a content set up in advance for each time schedule frame in which a content is demanded, following a on-demand type providing schedule control file 120 set up in advance by the content creator, so that a content made by an individual person can be provided as if from telecast whose programs change for each time schedule frame.

Due to that, the user of a client PC 4 make an access as many time as he/she likes without getting tired because a different content is provided for each time schedule frame.

Also, because the only kind of a content is provided to the client PC 3 in each time schedule frame in which a demand is made, the content can be transmitted swiftly without fail, not requiring as wide a bandwidth of a network resource as when providing plural kinds of contents simultaneously.

As well, as a content providing system 1 the user of the client PC 4 is never made to get weary so that the number of accesses may increase as a result of the increased popularity of the personal casting service, making it possible to structure a business model that may increasingly improve the advertisement effectiveness of a commercial video provided prior to a content.

Structured as described hitherto, in the content providing system 1 the management server 36 of the ASP 32 has the movie file of a content stored in the exclusive storage area in the content server 39 oriented to a URL assigned to each user PC 2, and provides a different kind of a content in order for each time schedule frame in which a content is demanded from a client PC 4, so that the content is provided to the user of the client PC 4 without making him/her weary.

(10) Operation and Effect of the Second Invention in the Present Mode of Embodiment Structured as above, in the case of the live type, the management server 36 of the ASP 32 secures the exclusive storage area in the content server 39 oriented to a URL assigned to each public channel for the public for the purpose of supply a content of a live video, and make a reservation for each time schedule frame so that a plurality of users PC 2 can share the exclusive storage area.

Then, the management server 36 of the ASP 32 writes contents of a live video supplied from a user PC 2 having made a reservation over the Internet 5 in the exclusive content server 39 in reserved time schedule frames, which are streaming-reproduced in order, thereby making it possible to provided contents of a live video on the real time over the Internet 5 to clients PC 4 accessing the public channel.

At this time the management server 36 of the ASP 32 is to provide the contents of a live video through a public channel for the public being accessed by clients PC 4 a large number of times, so that contents can be provided widely to many and unspecific clients PC 4 accessing the public channel.

And, as a content providing system 1, because different kinds of contents of a live video can be provided for each time schedule frame in which a client PC 4 accesses the public channel, the client PC will not get weary. As a result, the number of accesses may increase due to the rising popularity of the personal casting service, making it possible to configure a business model that may increasingly enhance the advertisement effect of a commercial video to be provided prior to a content.

Also, in a computer network system, in the case that a user of a client PC 4 has a desire to be provided with any content of a specific category (e.g., "music live" or "car") regardless of who the creator is, it is not necessary for him/her to access each individual homepage after specifying a video category with a retrieval engine, etc. The client PC 4 can have various contents regarding specific video categories (e.g., "music live" or "car" in each time schedule frame by merely accessing the public channel.

According to the foregoing structure, the management server 36 of the ASP 32 in the content providing system 1 secures the storage area in the content server 39 oriented to a URL assigned to each public channel for the public, and reserves each time schedule frame so that a plurality of users PC 2 can share the exclusive storage area, with the use of which a content of a live video can be stream-reproduced in each reserved time schedule frame, thereby making it possible to provide a content of a live video on the real time to many and unspecific clients PC 4 accessing in each time schedule frame.

(11) Operations and Effects of the Third Invention in the Present Mode of Embodiment In the structure described, the management server 36 of the ASP 32 receives a live type providing schedule control file 210 for my channels (FIG. 35) transmitted from a user PC 2 over the Internet, which is registered in the providing schedule management database 38.

It should be noted, however, that, with the limitation put on the number of contents of a live video to be provided from each my channel in the same time schedule frame when accepting reservations by which to provide contents of a live video through my channel, the management server 36 of the ASP 32 will not accept a live type providing schedule control file 210 for my channel (FIG. 345) thereafter, with the image data on a reservation unable message display screen transmitted to the user PC 2, letting the display unit 17 of the user PC 2 indicate a reservation unable message display screen 212 (FIG. 36).

Thus, the management server 36 of the ASP 32 lets the content creator confirm the reservation unable message display screen 212 indicated on the display unit 17 of the user PC 2, thereby letting the content creator become aware that the desired time schedule frame is already fully booked to provide a content of a live video.

In this way, that is, with a limitation put on the number of contents of a live video to be provided at one time responding to demands from a plurality of clients PC 4 in consideration of the processing performance of the management server 36 and the bandwidth of the line, the management server 36 of the ASP 32 is capable of providing contents of a live video swiftly on the real time to the client PC 4 without delay.

Structured as described hitherto, with a limitation put on the number of contents to be provided at one time the management server 36 of the ASP 32 can provide the number of contents within the limitation on the real time without fail. Also, when the number of contents reaches the upper value of the limitation, the management server 36 of the ASP 32 will not accept further reservations thereafter, and lets the display unit 17 of the user PC 2 indicate the reservation unable message display screen 212, which makes the content creator aware that a reservation is impossible.

(12) Other Modes of Embodiment

In the foregoing mode of embodiment, explanation is given on the case where a content of a movie is provided to a client PC 4 through the content server 39 as content storing and providing means over the Internet 5 as a network following the on-demand type providing schedule control file 120 as a providing schedule stored in the providing schedule management database 38 as a providing schedule database under the control of the management server 36 as control means. However, the present invention is not limited to it, and a content of still images or music data may be provided. In this case, too, similar effect to that in the foregoing mode of embodiment can be obtained.

Furthermore, in the foregoing mode of embodiment, explanation is given on the case where the storage area in the content server 39 oriented to a public channel for the public is prepared for each video category (wedding ceremony channel, music live channel, theater live channel, event live channel), however, the present invention is not limited to it, and the exclusive storage area can be prepared for each of other categories such as artists.

Also, in the foregoing mode of embodiment, explanation is given on the case where the content server 39 as content storing and providing means stores a content of a movie supplied from a user PC 2 as the first information processing device, and provides the content to a client PC 4 as the second information processing device on the real time, however, the present invention is not limited to it, and contents other than live video such as those of still images or music data can be provided.

Furthermore, in the foregoing mode of embodiment, explanation is given on the case where the management server 36 of the ASP 32 as control means controls a system so that a plurality of users PC 2 can share the exclusive storage area in the content server 39 oriented to a public channel in each time schedule frame, however, the present invention is not limited to it, and it can be shared on a basis of the day of the week.

Furthermore, in the foregoing mode of embodiment, explanation is given on the case where a limitation is put on the number of contents of a live video to be provided at one time by the content server 39 as content storing means through my channel. However, the present invention is not limited to it, and a limitation can be set to the numbers of other various items according to the processing performance of the management server 36 and the bandwidth of the line. In this case, too, similar effects to those in the foregoing mode of embodiment can be obtained.

Furthermore, in the foregoing mode of embodiment, explanation is given on the case where the management server 36 of the ASP 32 as providing schedule setting means and control means lets the display unit 17 of the user PC 2 display the reservation unable message display screen 212 by transmitting the image data of a reservation unable message display screen to a user PC 2. However, the present invention is not limited to it, and other time schedule frames for which a reservation is available can be indicated on the reservation unable message display screen 212, along with a reservation unable message.

Furthermore, in the foregoing mode of embodiment, explanation is given on the case where a live video is used as a content provided by the management server 36 of the ASP 32, however, the present invention is not limited to it, and live voices can be used as well.

Also, a content providing program with which to perform a content providing processing of the on-demand type, a content providing program with which to perform a content providing processing of the live type, a providing schedule program with which to display a reservation unable message display screen 212 on the display unit 17 of the user PC 2 are installed on the hard disc in the management server 36 of the ASP 32. However, the present invention is not limited to it, but the content providing program or the providing schedule program can be installed by reproducing a program storing media composed of package media such as a Compact Disc-Read only Memory (CD-ROM) and Digital Versatile Disc (DVD) storing the content providing program or the providing schedule program. As well, the content providing program or the providing schedule program can be installed by reproducing program storing media such as a semiconductor memory or magneto-optical disc capable of storing the content providing program or the providing schedule program temporarily or permanently.

Wired or wireless communication media such as a local area network and digital satellite broadcast can be also used as means for storing the content providing program or the providing schedule program into those program storing media. Also, a variety of communication interfaces such as a router or modem can be involved in the process of storing.

Furthermore, in the foregoing mode of embodiment, explanation is given on the case where the Internet 5 is used as a network. However, the present invention is not limited to it, and a variety of other networks configured wired or wireless can be employed.

Furthermore, in the aforementioned mode of embodiment, explanation is given on the case where a client PC 4 is used as an object the management server 36 of the ASP 32 provides a content to. However, the present invention is not limited to it, but a content can be provided responding to demands through portable information terminals or mobile telephones having a display provided that they be connected over the Internet 5. It is also possible with the digital video cameras or digital still cameras with a communication function. Moreover, in the user PC 2 of the content creator, a content can be provided using the portable information terminals or mobile telephones having a camera. It is also possible with the digital video cameras or digital still cameras with a communication function.

According to the first invention of the present invention described hitherto, because different kinds of contents can be provided, as if from a personal broadcast station, in each time schedule frame in which a demand is made by a client, it is possible to provide many kinds of contents in order in accordance with the providing schedule without making the client weary, still more, the only kind of a content in each time schedule frame, so that contents can be provided swiftly without fail, not consuming a large part of the bandwidth of a line.

According to the second invention of the present invention described hitherto, because a plurality of the first information processing devices can share the exclusive storage area placed in the content storing and providing means for the public, a plurality of the first information processing devices having written contents in the exclusive storage area can provide contents widely to many and unspecific second information processing devices accessing the exclusive storage placed for the public.

According to the third invention of the present invention, with the upper limitation value put on the number of contents to be provided at one time, when it is detected that the number of contents to be provided in a desired providing schedule time at one time reaches a given upper limitation, it is notified of an information processing device that a reservation can not be made at that particular providing schedule time over a network, preventing against setting a providing schedule for the number of contents exceeding the upper limitation value, so that contents can be always provided to a plurality of clients swiftly without fail.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A content providing device, comprising:

content storing and providing means for storing a plurality of contents in a storage area exclusive to a client and providing said plurality of contents over a network in response to a demand from said client;

a providing schedule database containing a providing schedule for providing content from said plurality of contents according to a time frame set up in said providing schedule; and control means for recognizing said time frame set up in said providing schedule based on a time when said demand from said client is made over said network to said content storing and providing means.

2. The content providing device according to claim 1 wherein said storage area exclusive to the client is oriented to a Uniform Resource Locator (URL) assigned to the client.

3. The content providing device according to claim 1 wherein said content storing and providing means continues providing content until completion, even after the time frame set up in said providing schedule is over.

4. A content providing system, comprising:

a client for sending a demand for content to be provided over a network; and a content providing device for providing content over said network in response to said demand from said client; said content providing device including:

content storing and providing means for storing a plurality of contents in a storage area exclusive to said client and providing content from said plurality of contents over said network;

a providing schedule database containing a providing schedule for providing content from said plurality of contents according to a time frame set up in said providing schedule; and control means for recognizing the time frame set up in said providing schedule based on a time when said demand from said client is made over said network to said content storing and providing means.

5. The content providing system according to claim 4 wherein said storage area exclusive to the client is oriented to a Uniform Resource Locator (URL) assigned to said client.

6. The content providing system according to claim 4 wherein said content storing and providing means continues providing content until completion, even after the time frame set up in said providing schedule is over.

* * * * *